US012631590B2

(12) United States Patent
Lee et al.

(10) Patent No.:  US 12,631,590 B2
(45) Date of Patent:  May 19, 2026

(54) SEMICONDUCTOR STRUCTURE HAVING BIOSENSOR AND MANUFACTURING METHOD THEREOF

(71) Applicant: Taiwan Semiconductor Manufacturing Company, Ltd., Hsinchu (TW)

(72) Inventors: Wei Lee, Hsinchu City (TW); Katherine H Chiang, New Taipei City (TW); Pei-Wen Liu, Hsinchu City (TW); Ke-Wei Su, Hsinchu County (TW); Kuan-Lun Cheng, Hsin-Chu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 868 days.

(21) Appl. No.: 17/840,641

(22) Filed: Jun. 15, 2022

(65) Prior Publication Data

US 2023/0408442 A1      Dec. 21, 2023

(51) Int. Cl.
*G01N 27/414* (2006.01)
*B01L 3/00* (2006.01)

(52) U.S. Cl.
CPC .... *G01N 27/4145* (2013.01); *B01L 3/502715* (2013.01); *G01N 27/4148* (2013.01); *B01L 2200/16* (2013.01); *B01L 2300/0636* (2013.01); *B01L 2300/0645* (2013.01); *B01L 2300/1827* (2013.01)

(58) Field of Classification Search
None
See application file for complete search history.

(56) References Cited

U.S. PATENT DOCUMENTS

| | | | | |
|---|---|---|---|---|
| 11,293,897 | B2 * | 4/2022 | Chiang | G01N 27/4145 |
| 2016/0252517 | A1 * | 9/2016 | Lo | G01N 15/0656 |
| | | | | 506/9 |
| 2017/0343498 | A1 * | 11/2017 | Kalnitsky | H01L 23/5228 |
| 2018/0164246 | A1 * | 6/2018 | Chen | H10D 86/201 |
| 2019/0056348 | A1 * | 2/2019 | Liu | H10N 19/00 |
| 2022/0205948 | A1 * | 6/2022 | Wang | H10D 62/83 |

* cited by examiner

*Primary Examiner* — Christine S. Kim
*Assistant Examiner* — Tien Tran
(74) *Attorney, Agent, or Firm* — JCIPRNET

(57)      ABSTRACT

A semiconductor structure includes an isolation structure penetrating through a semiconductor substrate, a biosensor coupled to the semiconductor substrate, and a cover. The biosensor includes a bio-sensing device, a voltage-reference device spaced apart from the bio-sensing device, thermal management devices in proximity to the bio-sensing device, and a patterned dielectric layer. Each of the bio-sensing and voltage-reference devices includes a gate structure disposed on a bottom surface of the semiconductor substrate, source/drain (S/D) regions disposed in the semiconductor substrate, and a portion of a sensing film disposed on the semiconductor substrate and capacitively coupled to the gate structure and the S/D regions. Each thermal management devices includes a gate structure underlying the isolation structure or the semiconductor substrate. The patterned dielectric layer overlying the semiconductor substrate includes sensing wells located above the voltage-reference and bio-sensing devices. The cover overlying the patterned dielectric layer includes fluid channels communicating with the sensing wells.

20 Claims, 25 Drawing Sheets

SEMICONDUCTOR STRUCTURE HAVING BIOSENSOR AND MANUFACTURING METHOD THEREOF

BACKGROUND

Biosensors are devices for sensing and detecting biomolecules and operate on the basis of electronic, electrochemical, optical, and mechanical detection principles. Biosensors that include transistors are sensors that electrically sense charges, photons, and mechanical properties of bio-entities or biomolecules. The detection can be performed by detecting the bio-entities or biomolecules themselves, or through interaction and reaction between specified reactants and bio-entities/biomolecules. Such biosensors can be manufactured using semiconductor processes, can quickly convert electric signals, and can be easily applied to integrated circuits (ICs) and Micro-Electro-Mechanical Systems (MEMS). Currently, reliability of the bio-MEMS devices can be a challenge because of thermal management issues of the bio-MEMS devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1-11A are schematic cross-sectional views illustrating various stages of a manufacturing method of a semiconductor structure, in accordance with some embodiments.

DETAILED DESCRIPTION

Figures 1, 2:
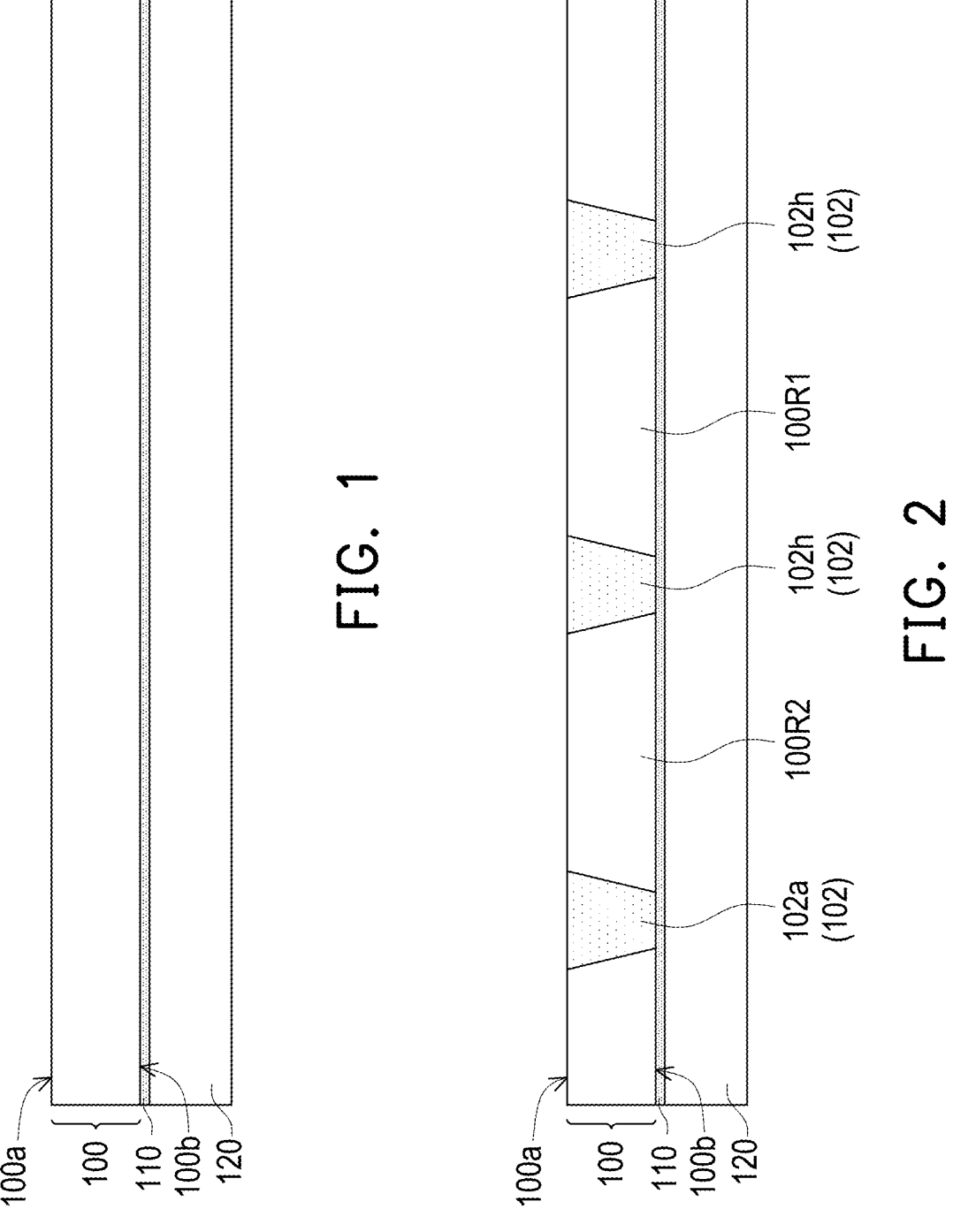

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Unless defined otherwise, all technical and scientific terms used herein have the same meanings as commonly understood by one of ordinary skill in the art to which this disclosure belongs. Although any methods and materials similar or equivalent to those described herein can be used in the practice or testing of embodiments in accordance with the disclosure; the methods, devices, and materials are now described.

Figure 9:
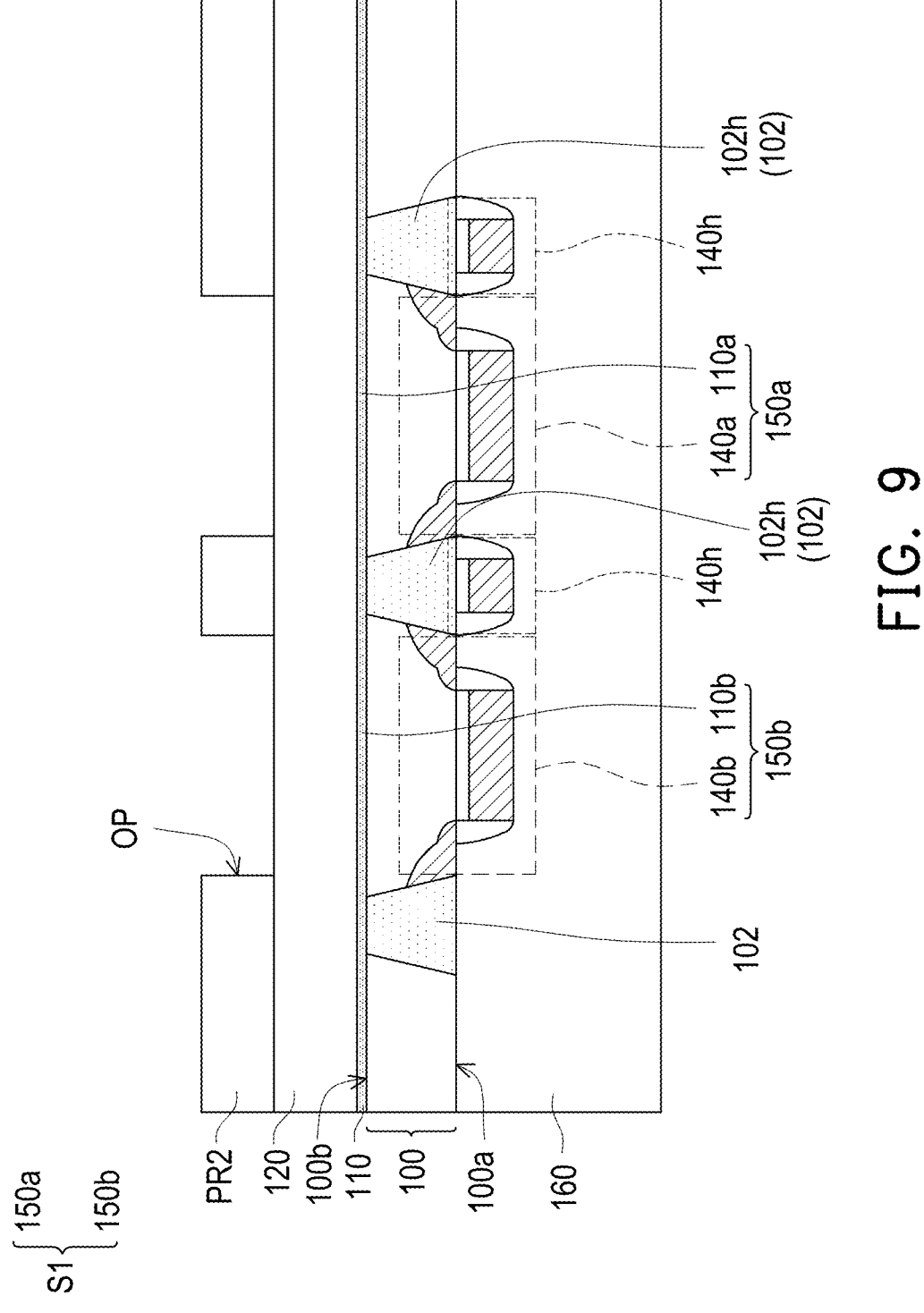
Figure 10:
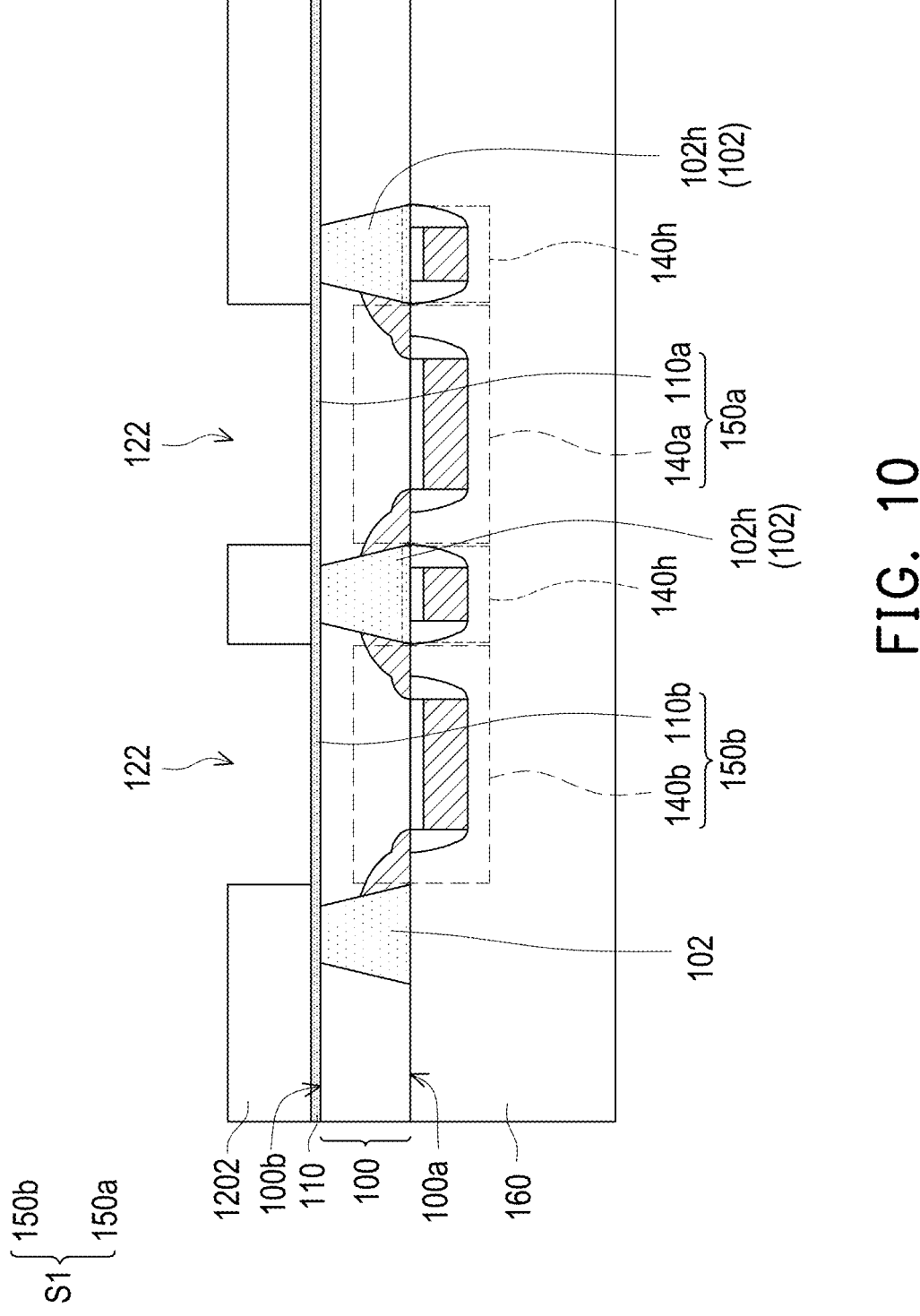
Figure 11A:
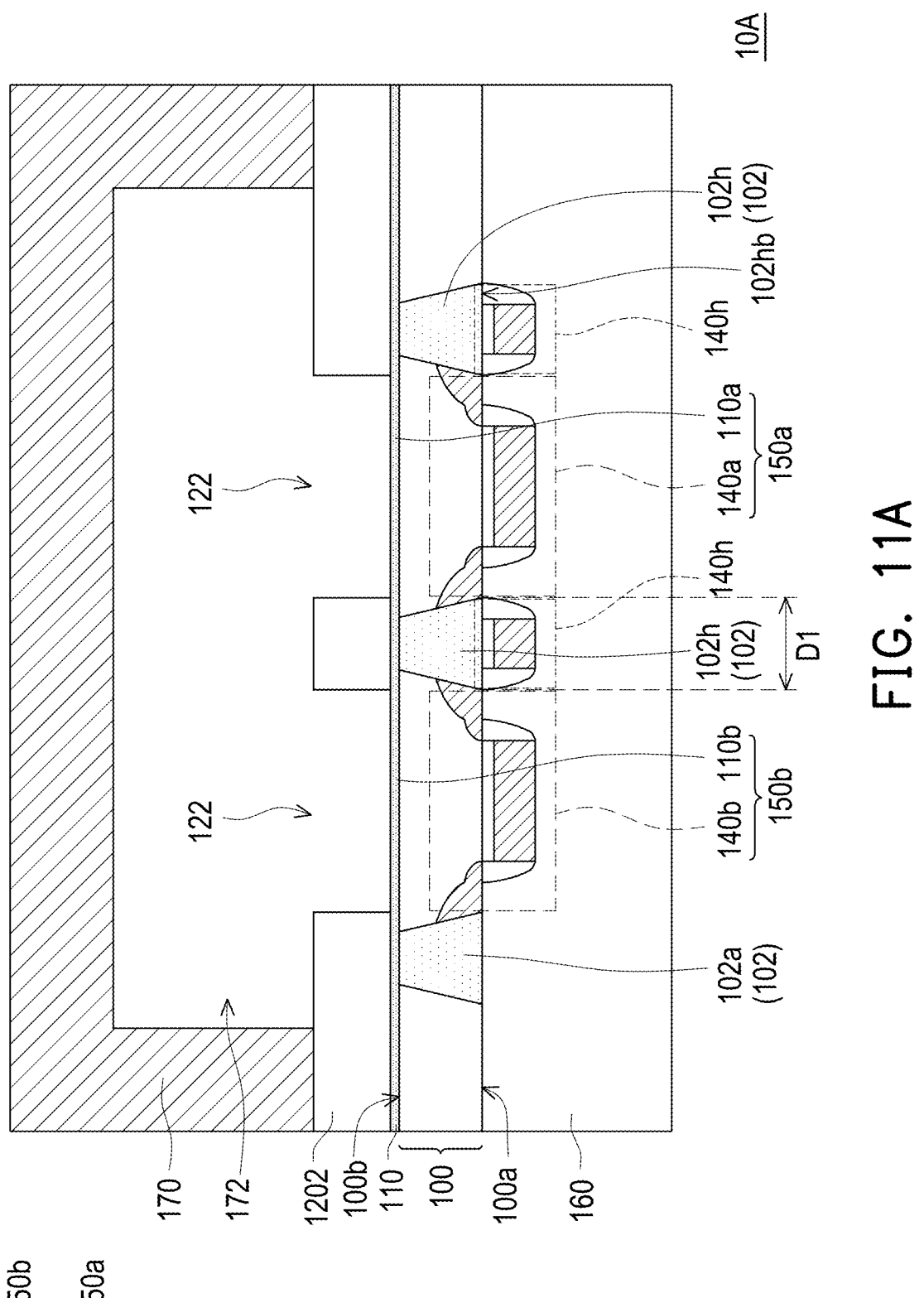
Figure 11B:
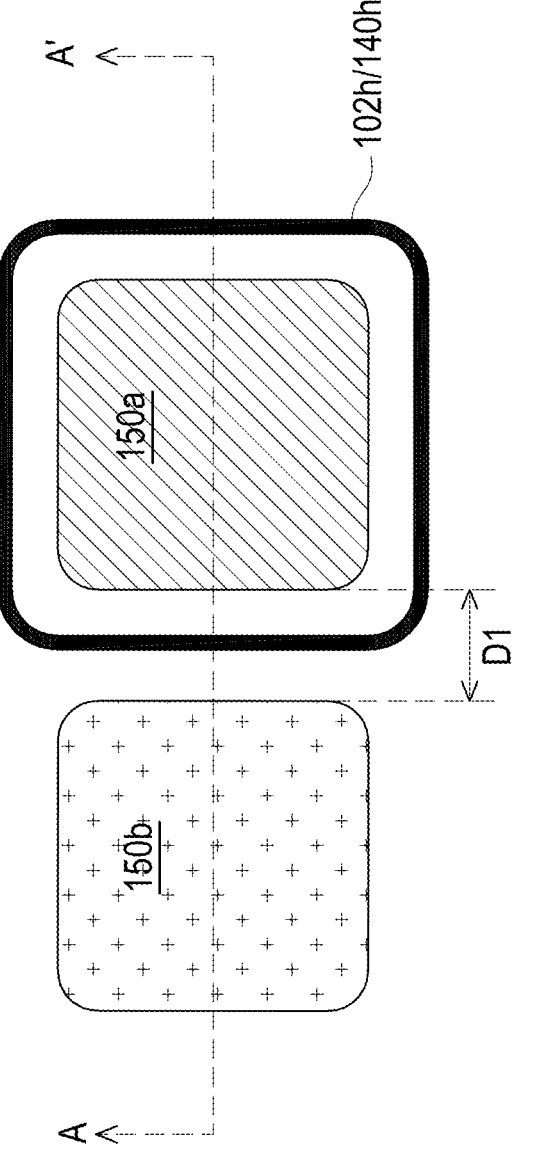
FIGS. 11B-11C are schematic and simplified top views illustrating various configuration of the structure of FIG. 11A, in accordance with some embodiments.
Figure 11B:
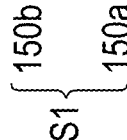
Figure 11C:
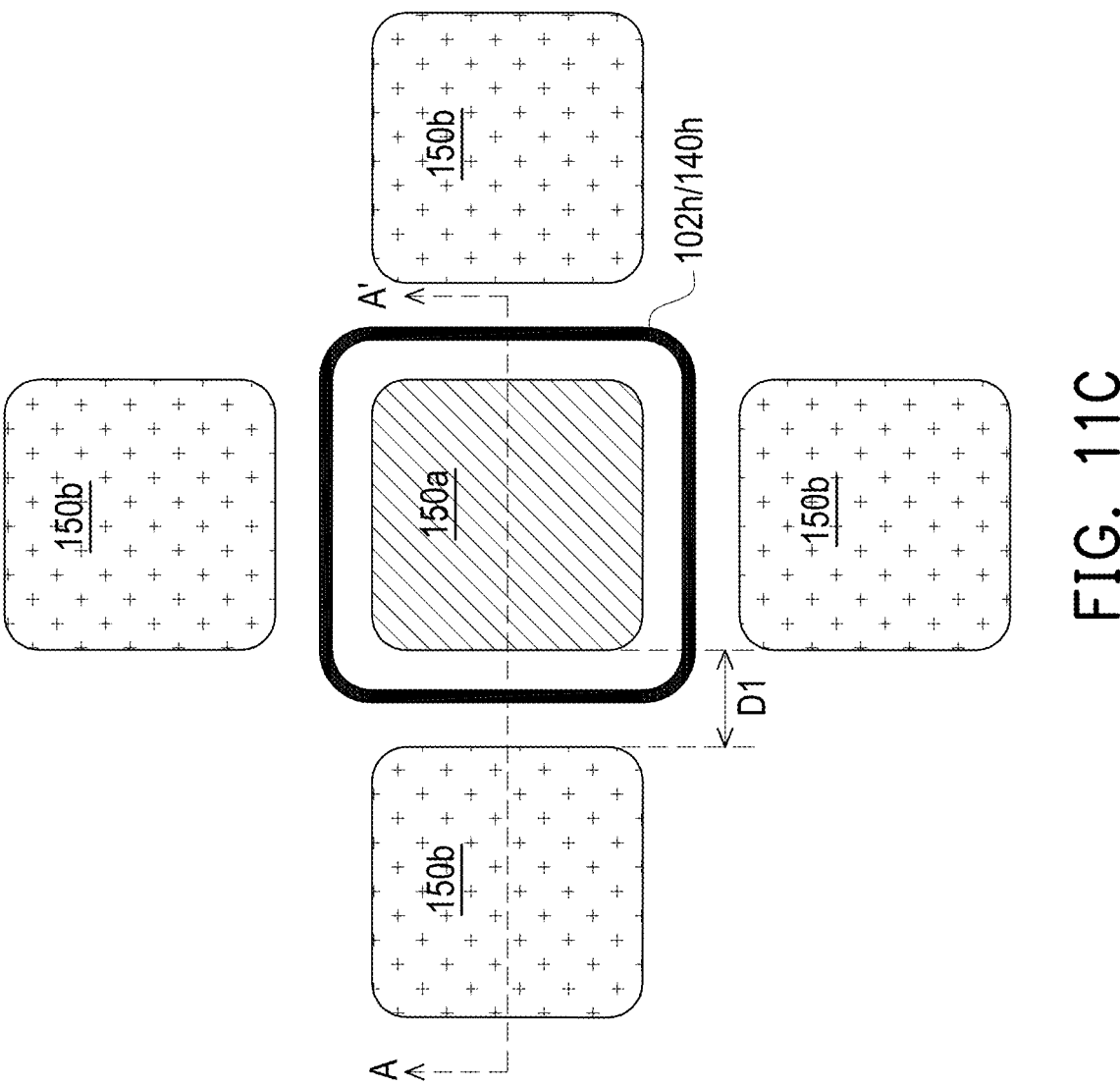

FIGS. 1-11A are schematic cross-sectional views illustrating various stages of a manufacturing method of a semiconductor structure, and FIGS. 11B-11C are schematic and simplified top views illustrating various configuration of the structure of FIG. 11A, in accordance with some embodiments.

Referring to FIG. 1, a sensing film 110 and a dielectric layer 120 are provided on a semiconductor substrate 100. In some embodiments, the semiconductor substrate 100, the sensing film 110, and the dielectric layer 120 are provided and collectively viewed as a silicon-on-insulator (SOI) substrate. In some embodiments, the sensing film 110 and the dielectric layer 120 are sequentially formed on the semiconductor substrate 100. The semiconductor substrate 100 may include a first surface 100a and a second surface 100b opposite to each other. In some embodiments, the first surface 100a is a front-side surface of the semiconductor substrate 100, and the second surface 100b is a back-side surface of the semiconductor substrate 100. The semiconductor substrate 100 may include a crystalline silicon wafer. In some embodiments, the semiconductor substrate 100 is made of suitable elemental semiconductor, such as diamond or germanium; a suitable compound semiconductor, such as gallium arsenide, silicon carbide, indium arsenide, or indium phosphide; or a suitable alloy semiconductor, such as silicon germanium carbide, gallium arsenic phosphide, or gallium indium phosphide.

The sensing film 110 is disposed between the semiconductor substrate 100 and the dielectric layer 120. For example, the sensing film 110 and the dielectric layer 120 are formed on the second surface 100b of the semiconductor substrate 100 through a chemical vapor deposition (CVD) process, a physical vapor deposition (PVD) process or other suitable deposition process. For example, the material of the sensing film 110 includes $HfO_2$, $SiO_2$, SiON, SiN, or other suitable sensing materials. In some embodiments, the sensing film 110 includes multiple regions, and those regions of the sensing film 110 are formed by the same sensing material. Alternatively, the sensing film 110 includes regions formed by different sensing materials. In some embodiments, the dielectric layer 120 includes a silicon dioxide layer, a silicon nitride layer, or other suitable dielectric layer. In some embodiments, the dielectric layer 120 includes a high-k dielectric layer and/or a low-k dielectric layer. The term "high-k" used herein refers to a high dielectric constant that is greater than the dielectric constant of $SiO_2$ (i.e., greater than 3.9). The term "low-k" used herein refers to a low dielectric constant that is less than the dielectric constant of $SiO_2$ (i.e., less than 3.9).

The sensing film 110 may be a layer of immobilized capture reagents that act as surface receptors to detect the presence of a target analyte of biological origin. As used herein, the term "immobilized" when used with respect to, e.g., a capture reagent, includes substantially attaching the capture reagent at a molecular level to a surface. For example, a capture reagent may be immobilized to a surface of the sensing layer using adsorption techniques including non-covalent interactions (e.g., electrostatic forces, van der Waals, and dehydration of hydrophobic interfaces) and covalent binding techniques where functional groups or linkers facilitate attaching the capture reagent to the surface of the sensing layer. Immobilizing a capture reagent to a surface of the sensing film may be based upon the properties of the surface, the medium carrying the capture reagent, and the properties of the capture reagent. In some cases, a surface of the sensing film may be first modified to have functional groups bound thereto. The functional groups may then bind to biomolecules or biological or chemical substances to immobilize them thereon.

As used herein, "capture reagent" is a molecule or compound capable of binding the target analyte or target reagent, which can be directly (or indirectly) attached to a substantially solid material. The capture reagent can be a chemical, and specifically any substance for which there exists a naturally occurring target analyte (e.g., an antibody, polypeptide, DNA, RNA, cell, virus, etc.) or for which a target analyte can be prepared, and the capture reagent can bind to one or more target analytes in an assay. The term "chemical" refers to a substance, compound, mixture, solution, emulsion, dispersion, molecule, ion, dimer, macromolecule such as a polymer or protein, biomolecule, precipitate, crystal, chemical moiety or group, particle, nanoparticle, reagent, reaction product, solvent, or fluid any one of which may exist in the solid, liquid, or gaseous state, and which is typically the subject of an analysis. The term "reaction" refers to a physical, chemical, biochemical, or biological transformation that involves at least one chemical and that generally involves (in the case of chemical, biochemical, and biological transformations) the breaking or formation of one or more bonds such as covalent, noncovalent, van der Waals, hydrogen, or ionic bonds. The term includes typical chemical reactions such as synthesis reactions, neutralization reactions, decomposition reactions, displacement reactions, reduction-oxidation reactions, precipitation, crystallization, combustion reactions, and polymerization reactions, as well as covalent and noncovalent binding, phase change, color change, phase formation, crystallization, dissolution, light emission, changes of light absorption or emissive properties, temperature change or heat absorption or emission, conformational change, and folding or unfolding of a macromolecule such as a protein.

The term "antibody", as used herein, refers to a polypeptide of the immunoglobulin family that is capable of binding a corresponding antigen non-covalently, reversibly, and in a specific manner. For example, a naturally occurring IgG antibody is a tetramer comprising at least two heavy (H) chains and two light (L) chains inter-connected by disulfide bonds. Each heavy chain is comprised of a heavy chain variable region (abbreviated herein as VH) and a heavy chain constant region. The heavy chain constant region is comprised of three domains, $CH_1$, $CH_2$ and $CH_3$. Each light chain is comprised of a light chain variable region (abbreviated herein as VL) and a light chain constant region. The light chain constant region is comprised of one domain, CL. The VH and VL regions can be further subdivided into regions of hypervariability, termed complementarity determining regions (CDR), interspersed with regions that are more conserved, termed framework regions (FR). Each VH and VL is composed of three CDRs and four FRs arranged from amino-terminus to carboxy-terminus in the following order: FR1, CDR1, FR2, CDR2, FR3, CDR3, and FR4. The three CDRs constitute about 15-20% of the variable domains. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (Clq) of the classical complement system. (Kuby, Immunology, $4^{th}$ ed., Chapter 4. W.H. Freeman & Co., New York, 2000). The term "antibody" includes, but is not limited to, monoclonal antibodies, human antibodies, humanized antibodies, chimeric antibodies, and anti-idiotypic (anti-Id) antibodies (including, e.g., anti-Id antibodies to antibodies of the invention). The antibodies can be of any isotype/class (e.g., IgG, IgE, IgM, IgD, IgA and IgY), or subclass (e.g., IgGi, IgG2, IgG3, IgG4, IgAQ1 and IgA2).

The term "assay", as used herein, refers to a process or step involving the analysis of a chemical or a target analyte and includes, but is not limited to, cell-based assays, biochemical assays, high-throughput assays and screening, diagnostic assays, pH determination, nucleic acid hybridization assays, polymerase activity assays, nucleic acid and protein sequencing, immunoassays (e.g., antibody-antigen binding assays, ELISAs, and iqPCR), bisulfite methylation assays for detecting methylation pattern of genes, protein assays, protein binding assays (e.g., protein-protein, protein nucleic acid, and protein-ligand binding assays), enzymatic assays, coupled enzymatic assays, kinetic measurements (e.g., kinetics of protein folding and enzymatic reaction kinetics), enzyme inhibitor and activator screening, chemiluminescence and electrochemiluminescence assays, fluorescent assays, fluorescence polarization and anisotropy assays, absorbance and colorimetric assays (e.g., Bradford assay, Lowry assay, Hartree-Lowry assay, Biuret assay, and BCA assay), chemical assays (e.g., for the detection of environmental pollutants and contaminants, nanoparticles, or polymers), and drug discovery assays.

The term "target analyte", as used herein, is the substance to be detected in the test sample using embodiments in accordance with the present disclosure. The target analyte can be a chemical, and specifically any substance for which there exists a naturally occurring capture reagent (e.g., an antibody, polypeptide, DNA, RNA, cell, virus, etc.) or for which a capture reagent can be prepared, and the target analyte can bind to one or more capture reagents in an assay. "Target analyte" includes any antigenic substances, antibodies, and combinations thereof. The target analyte can include a protein, a peptide, an amino acid, a carbohydrate, a hormone, a steroid, a vitamin, a drug including those administered for therapeutic purposes as well as those administered for illicit purposes, a bacterium, a virus, and metabolites of or antibodies to any of the above substances.

The term "test sample", as used herein, means the composition, solution, substance, gas, or liquid containing the target analyte to be detected and assayed. The test sample can contain other components besides the target analyte, can have the physical attributes of a liquid, or a gas, and can be of any size or volume, including, e.g., a moving stream of liquid or gas. The test sample can contain any substances other than the target analyte as long as the other substances do not interfere with the binding of the target analyte with the capture reagent or the specific binding of the first binding member to the second binding member. Examples of test samples include, but are not limited to, naturally-occurring and non-naturally occurring samples or combinations thereof. Naturally-occurring test samples can be synthetic or synthesized. Naturally occurring test samples include body or bodily fluids isolated from anywhere in or on the body of a subject, including, but not limited to, blood, plasma, serum, urine, saliva or sputum, spinal fluid, cerebrospinal fluid, pleural fluid, lymph fluid, fluid of the respiratory, intestinal, and genitourinary tracts, tear fluid, saliva, breast milk, fluid from the lymphatic system, semen, intra-organ system fluid, ascitic fluid, tumor cyst fluid, amniotic fluid and combinations thereof, and environmental samples such as ground water or waste water, soil extracts, air, and pesticide residues or food-related samples.

The term "analysis", as used herein, refers to a process or step involving physical, chemical, biochemical, or biological analysis that includes, but is not limited to, characterization, testing, measurement, optimization, separation, synthesis, addition, filtration, dissolution, or mixing. The term "measurement" refers to the process of determining the amount, quantity, quality, or property of a target analyte based on its binding to a capture reagent. The term "detection" refers to the process of determining the presence or absence of a target analyte based on its binding to a capture reagent. Detection includes, but is not limited to, identification, measurement, and quantitation. Detected substances can include, e.g., nucleic acids (including DNA and RNA), hormones, different pathogens (including a biological agent that causes disease or illness to its host, such as a virus (e.g., H7N9 or HIV), a protozoan (e.g., *Plasmodium*-causing malaria), or a bacteria (e.g., *E. coli* or *Mycobacterium tuberculosis*)), proteins, antibodies, various drugs or therapeutics or other chemical or biological substances, including hydrogen or other ions, non-ionic molecules or compounds, polysaccharides, small chemical compounds such as chemical combinatorial library members, and the like. Detected or determined parameters may include, but are not limited to, e.g., pH changes, lactose changes, changing concentration, particles per unit time where a fluid flows over the device for a period of time to detect particles, e.g., particles that are sparse, and other parameters.

Referring to FIG. 2, isolation structures 102 are formed in the semiconductor substrate 100. Each isolation structure 102 may extend from the first surface 100a of the semiconductor substrate 100 to the second surface of the semiconductor substrate 100. For example, each isolation structure 102 penetrates through the semiconductor substrate 100. The top ends of the isolation structures 102 may be accessibly revealed from the first surface 100a of the semiconductor substrate 100. In some embodiments, the top ends of the isolation structures 102 are substantially leveled with the first surface 100a of the semiconductor substrate 100. The bottom ends of the isolation structures 102 may be in direct contact with the sensing film 110. In some embodiments, the isolation structures 102 are tapered toward the sensing film 110. The lateral dimension (e.g., width) of top ends of the isolation structures 102 may be greater than the lateral dimension (e.g., width) of the bottom ends of the isolation structures 102, and the isolation structures 102 may each have a tapered profile in the cross-sectional view.

The isolation structures 102 may be or may include shallow trench isolation (STI) structures. In an embodiment where the isolation structures 102 include STI structures, trenches are formed in the semiconductor substrate 100, and a dielectric material are deposited over the semiconductor substrate 100, and a planarization process is then performed to remove the excess dielectric material (e.g., the dielectric material located outside the trenches). The planarization process may be or include a chemical mechanical polishing (CMP) process), a mechanical grinding process, an etch process or combinations thereof. In some other embodiments, not shown in figures, the isolation structures 102 include local oxidation of silicon (LOCOS) structures. In an embodiment where the isolation structures 102 include LOCOS structures, a patterned mask layer is formed over the first surface 100a of the semiconductor substrate 100, and a thermal process is performed to oxidize the portions of the semiconductor substrate 100 which are revealed by the patterned mask layer. The patterned mask layer may include a pad layer (e.g., a pad oxide layer) and a hard mask layer (e.g., a silicon nitride layer) stacked over the pad layer, and the thermal process may include a thermal oxidation process (e.g., a rapid thermal annealing process).

In some embodiments, a first region 100R1 of the semiconductor substrate 100 is defined and surrounded by the isolation structures 102h, and a second region 100R2 of the semiconductor substrate 100 is insulated and separated from the first region 100R2 by the isolation structures 102h, where the second region 100R2 may be defined by the isolation structures 102h and 102a. For example, the isolation structures 102a and 102h are disposed on opposing sides of the second region 100R2 in the cross-sectional view. In some embodiments, the lateral dimensions of the first region 100R1 and the second region 100R2 are substantially identical to each other. The first region 100R1 and the second region 100R2 of the semiconductor substrate 100 may be oxide defined (OD) regions for formation of a sensing device. The details of the formation of the sensing device are described below.

Figure 3:
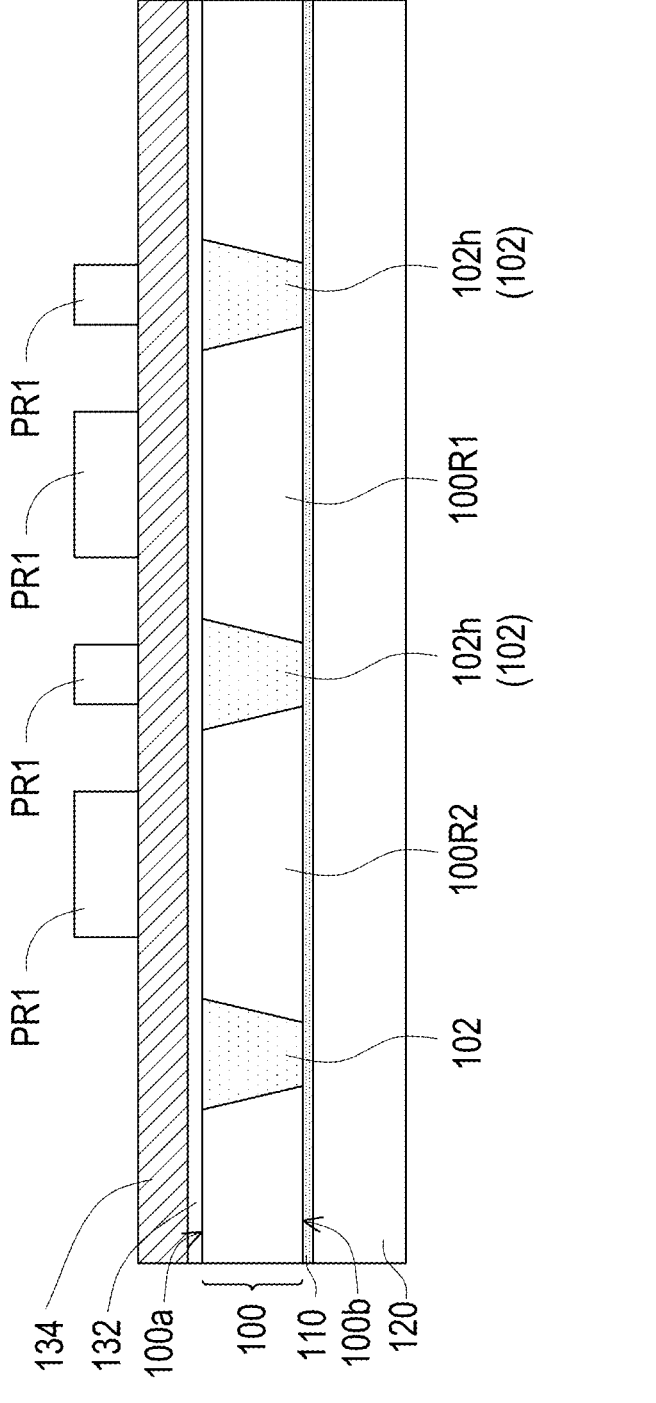

Referring to FIG. 3, a gate dielectric material layer 132, a conductive material layer 134, and a patterned photoresist layer PR1 are sequentially formed over the first surface 100a of the semiconductor substrate 100. The patterned photoresist layer PR1 covers portions of the conductive material layer 134 which are located above the first region 100R1 and the second region 100R2. The patterned photoresist layer PR1 may also cover portions of the conductive material layer 134 which are located above the isolation structures 102h surrounding the first region 100R1. The gate dielectric material layer 132 and the conductive material layer 134 may be formed by deposition processes, such as CVD, PVD, or other suitable deposition processes. The material of the gate dielectric material layer 132 may be or include SiO$_2$, SION, SiN, or other suitable dielectric materials. The material of the conductive material layer 134 may be or include Hf, Al, Ta, Ti, La, O, N, C, Au, Ag, Pt, Co, Ni, Sn, Sb, Ga, In, Ge, Bi, or other suitable conductive materials. The gate dielectric material layer 132 and the conductive material layer 134 may be deposited to entirely cover the first surface 100a of the semiconductor substrate 100. The patterned photoresist layer PR1 may be formed over the conductive material layer 134 by spin-coating, soft baking, exposure, development, hard baking, cleaning, and/or any suitable process.

Figure 4:
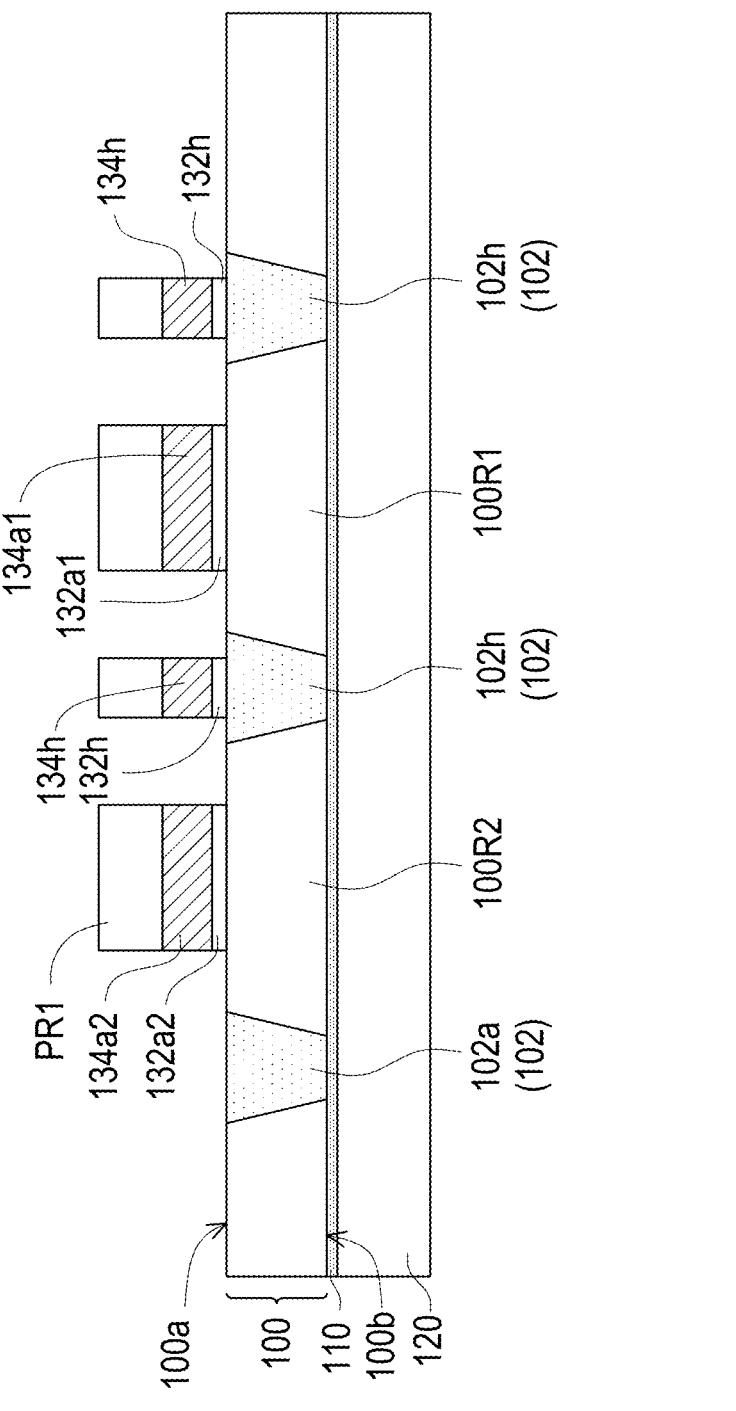

Referring to FIG. 4 and with reference to FIG. 3, a patterning process may be performed to remove portions of the conductive material layer 134 and the gate dielectric material layer 132 which are not covered by the patterned photoresist layer PR1 until the first surface 100a of the semiconductor substrate 100 and the top end (e.g., the wider end) of the isolation structure 102a are accessibly revealed. In some embodiments, a peripheral portion of each isolation structure 102h is also accessibly revealed, while a central portion of each isolation structure 102h is covered by the stacked layers (e.g., including the gate dielectric layer, the gate electrode, and the patterned photoresist layer). In some embodiments, an etching process (e.g., a single etching step or multiple etching steps) is performed to remove the portions of the conductive material layer 134 and the gate dielectric material layer 132 which are not covered by the patterned photoresist layer PR1. After the patterning process of the conductive material layer 134 and the gate dielectric material layer 132 is performed, gate dielectric layers 132a1, 132a2, and 132h as well as gate electrodes 134a1, 134a2, and 134h are formed, where the gate dielectric layer 132a1 and the gate electrode 134a1 are stacked over the first region 100R1 of the semiconductor substrate 100, the gate dielectric layer 132a2 and the gate electrode 134a2 are stacked over the second region 100R2 of the semiconductor substrate 100, and the gate dielectric layer 132h and the gate electrode 134h are stacked over the isolation structures 102h.

Figure 5:
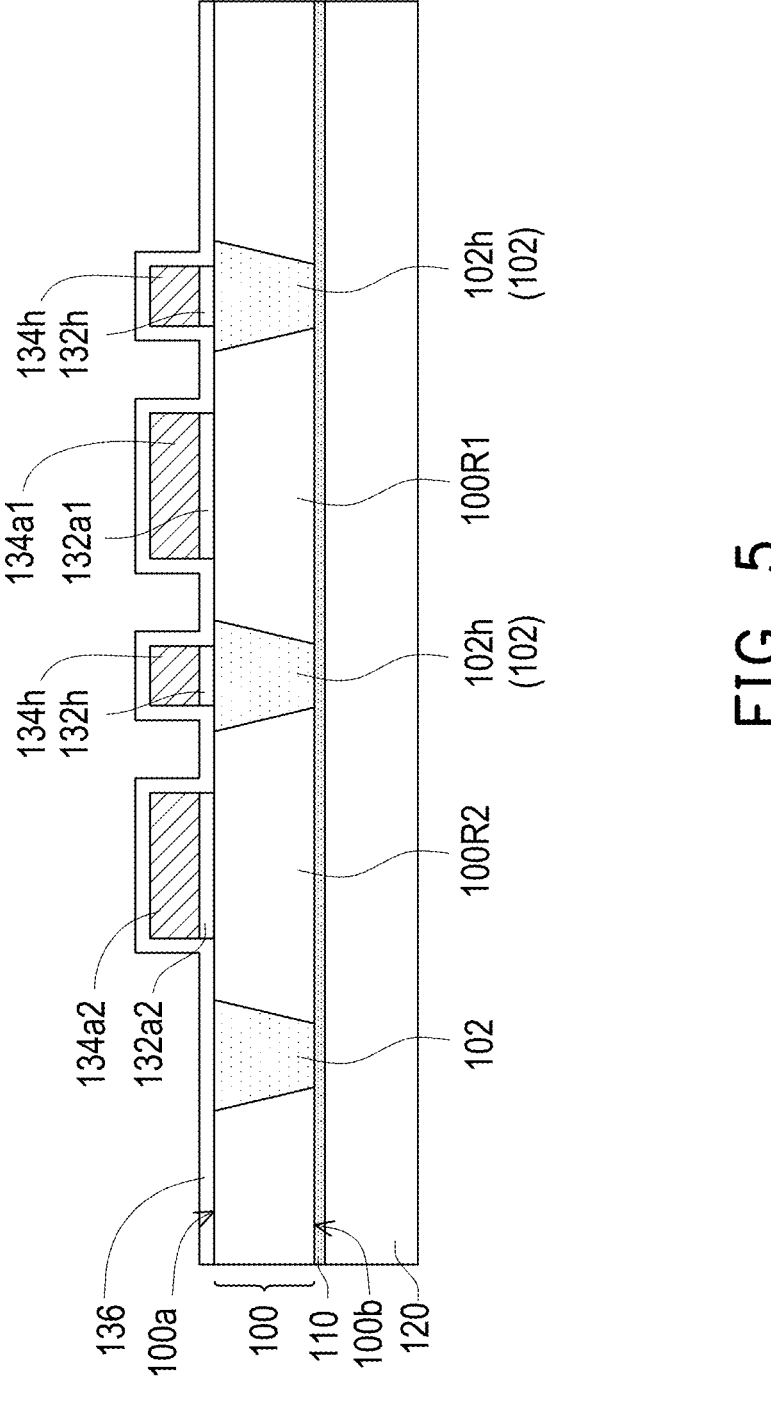

Referring to FIG. 5 and with reference to FIG. 4, the patterned photoresist layer PR1 is removed from the gate electrodes 134a1, 134a2, and 134h through, for example, a stripping process or other suitable removal process. Once the gate electrodes 134a1, 134a2, and 134h are accessibly revealed, a dielectric material layer 136 may be formed over the first surface 100a of the semiconductor substrate 100 to conformally cover the gate dielectric layers 132a1, 132a2, and 132h as well as the gate electrodes 134a1, 134a2, and 134h. The material of the dielectric material layer 136 may be or include silicon oxide, silicon nitride, silicon oxynitride, or other suitable dielectric materials.

Figure 6:
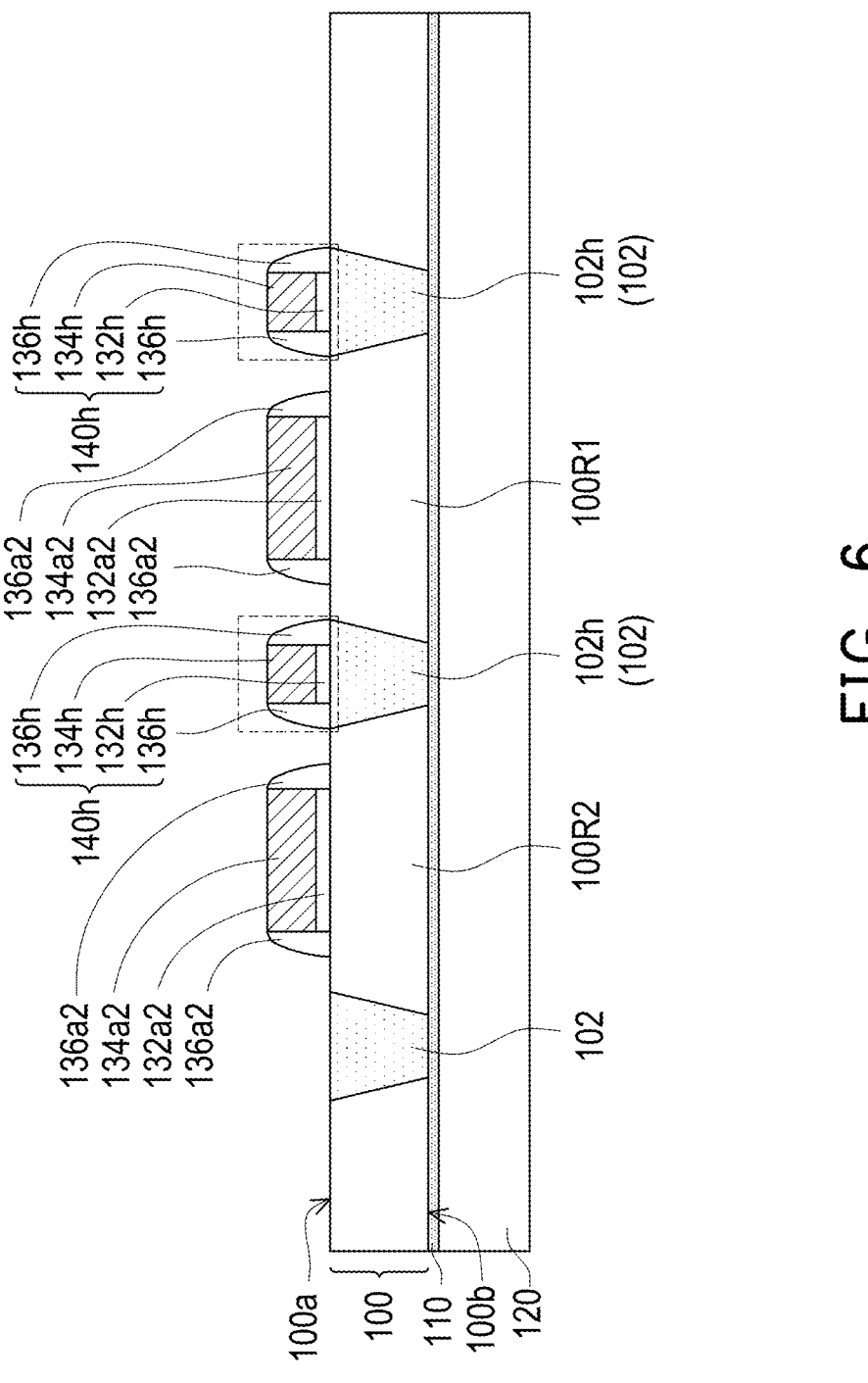

Referring to FIG. 6 and with reference to FIG. 5, a removal process is performed to partially remove the dielectric material layer 136 until the first surface 100a of the semiconductor substrate 100, the top end of the isolation structure 102a, and the top surfaces of the gate electrodes 134a1, 134a2, and 134h are accessibly revealed. After performing the removal process of the dielectric material layer 136, pairs of gate spacers 136a1, 136a2, and 136h are formed over the first region 100R1, the second region 100R2, and the isolation structures 102h, respectively. The pairs of gate spacers 136a1 covers sidewalls of the gate dielectric layer 132a1 and the gate electrode 134a1, the pairs of gate spacers 136a2 covers sidewalls of the gate dielectric layer 132a2 and the gate electrode 134a2, and the pairs of gate spacers 136h covers sidewalls of the gate dielectric layer 132h and the gate electrode 134h. The pairs of gate spacers 136h, the gate dielectric layer 132h, and the gate electrode 134h form a gate structure which may be viewed as a thermal management device 140h.

Figure 7:
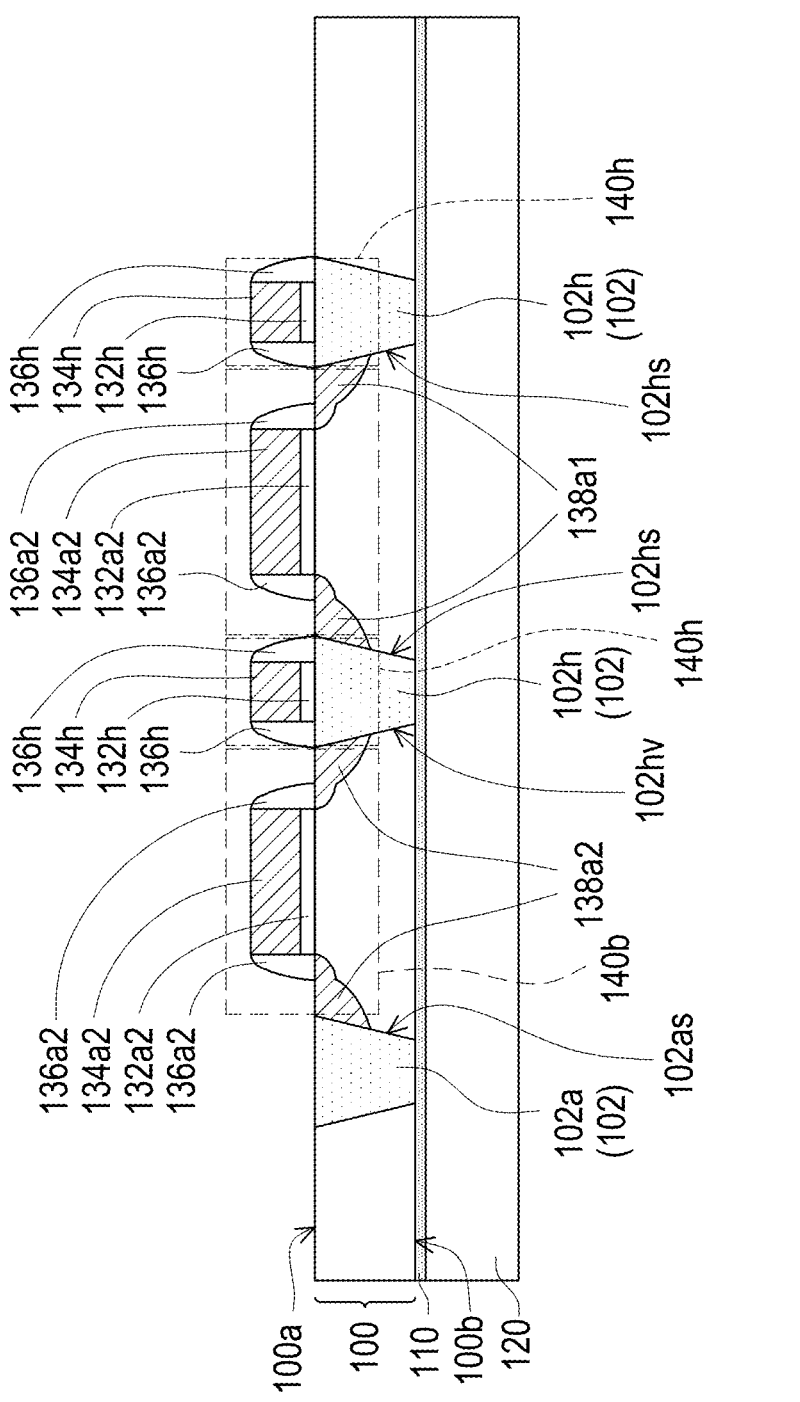

Referring to FIG. 7, source/drain (S/D) regions 138a1 and 138a2 are respectively formed in the first region 100R1 and the second region 100R2 of the semiconductor substrate 100. Source/drain region(s), as used herein, may refer to a source or a drain, individually or collectively dependent upon the context. For example, the S/D regions 138a1 formed in the first region 100R1 are coupled to the inner sidewalls 102hs of the isolation structure 102h, while the S/D regions 138a2 formed in the second region 100R2 are coupled to the outer sidewall 102hv of the isolation structure 102h and the inner sidewall 102as of the isolation structure 102a, wherein the top end of the isolation structure 102a is free of the gate structure formed thereon. The S/D regions 138a1 and 138a2 may be doped with p-type dopants, such as boron or BF2; n-type dopants, such as phosphorus or arsenic; and/or combinations thereof. The gate electrode 134a1 and the S/D regions 138a1 collectively configure as a first Field Effect Transistors (FET) 140a, and the gate electrode 134a2 and the S/D regions 138a2 collectively configure as a second FET 140b. The S/D regions 138a1 and 138a2 may be configured for n-type FETs and/or p-type FETs. A common type of FET is referred to as a metal oxide semiconductor field effect transistor (MOSFET). MOSFETs have been planar structures built in and on the planar surface of a substrate such as a semiconductor wafer. But recent advances in semiconductor manufacturing have resulted in three-dimensional, of fin-based, MOSFET structures.

Figure 8:
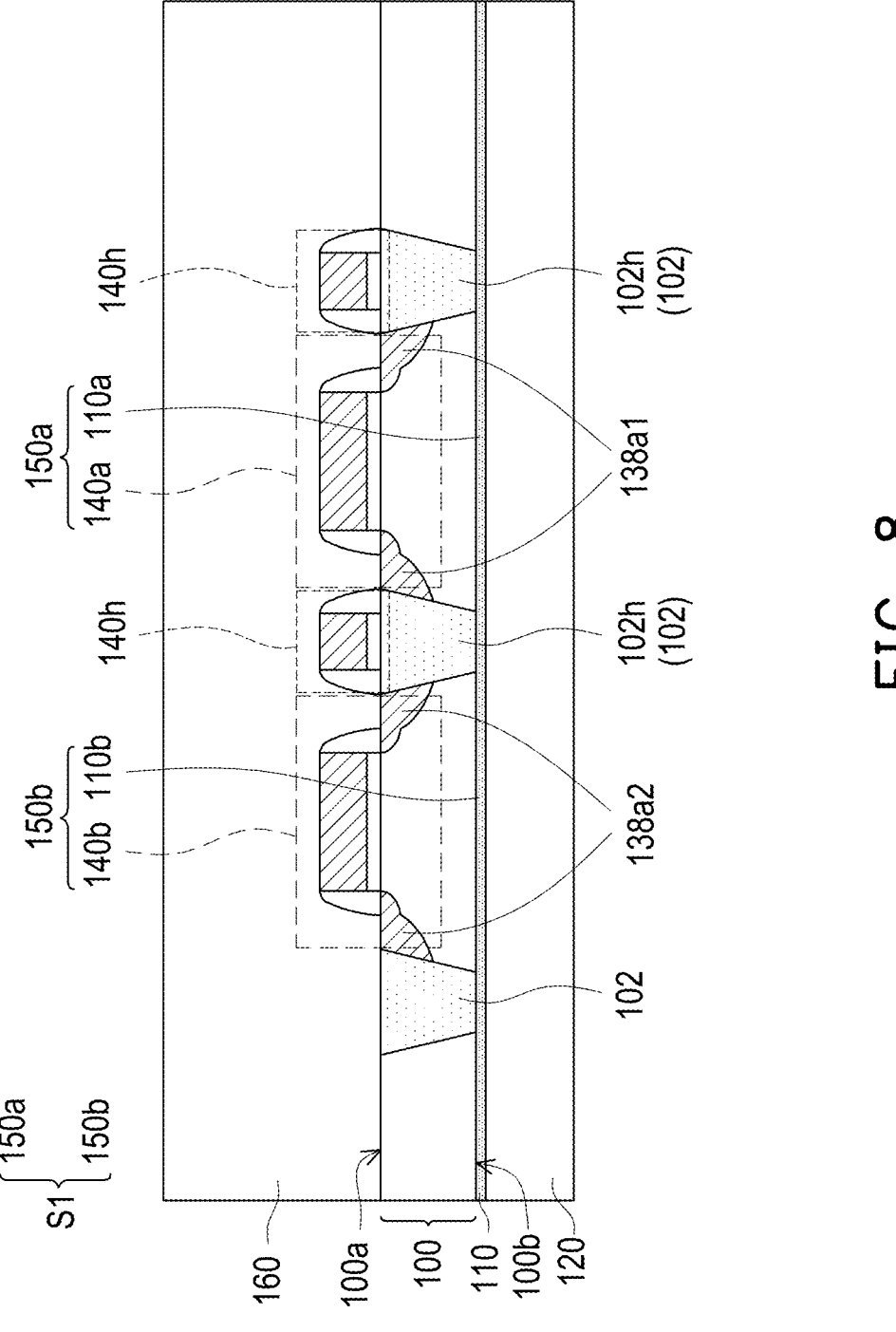

Referring to FIG. 8, after forming the first FET 140a and the second FET 140b, an interconnect structure 160 may be formed over the semiconductor substrate 100. The interconnect structure 160 may be formed through Back-End of Line (BEOL) processes. The interconnect structure 160 may include one or more dielectric layers (e.g., one or more interlayer dielectric (ILD) layers, intermetal dielectric (IMD) layers, or the like) and interconnect conductors (not individually shown) embedded in the one or more dielectric layers, where the interconnect conductors are electrically connected to the semiconductor devices (e.g., the first FET 140a, the second FET 140b, and the thermal management devices 140h). For example, a portion of the interconnect conductors of the interconnect structure 160 may be electrically coupled to the thermal management device 140h, such that the thermal management device 140h may serve as heating source of resistors. The material of the dielectric layers of the interconnect structure 160 may include silicon oxide, silicon nitride, silicon oxynitride, or other suitable dielectric material. The interconnect conductors of the interconnect structure 160 may include metallic conductors. For example, the interconnect conductors include copper conductors, copper pads, aluminum pads or combinations thereof.

In some embodiments, a first sensing portion 110a of the sensing film 110 and the first FET 140a including gate electrode 134a1 and the S/D regions 138a1 collectively configure as a bio-sensing device 150a, where first sensing portion 110a is capacitively coupled to the first FET 140a, the second sensing portion 110b is capacitively coupled to the second FET 140b. In some embodiments, a second sensing portion 110b of the sensing film 110 and the second FET 140b including gate electrode 134a2 and the S/D regions 138a2 collectively configure as a voltage-reference device 150b, where the second sensing portion 110b is capacitively coupled to the second FET 140b. In some embodiments, the thermal management devices 140h surround the bio-sensing device 150a and may separate the bio-sensing device 150a from the voltage-reference device 150b. The bio-sensing device 150a and the voltage-reference device 150b are collectively configure as a sensor S1, and the thermal management devices 140h may be thermally coupled to the sensor S1 and provide suitable thermal control for the bio-sensor. Although a single sensor is illustrated, it should be understood that a bio-sensor may include more than two sensors arranged in array, and each sensor may include a bio-sensing device and a voltage-reference device disposed adjacent to the bio-sensing device.

Referring to FIG. 9 and with reference to FIG. 8, the resulted structure illustrated in FIG. 8 may be flipped upside down, and a patterned photoresist layer PR2 having the openings OP may be formed over the dielectric layer 120. Regions of the dielectric layer 120 may be revealed by the openings OP of the patterned photoresist layer PR2. The patterned photoresist layer PR2 may be formed over the dielectric layer 120 by spin-coating, soft baking, exposure, development, hard baking, cleaning processes, and/or any suitable process.

Referring to FIG. 10 and with reference to FIG. 9, a patterning process may be performed to remove portions of the dielectric layer 120 which are not covered by the patterned photoresist layer PR2 until the first sensing portion 110a and the second sensing portion 110b of the sensing film 110 are accessibly revealed. In some embodiments, an etching process is performed to remove the portions of the dielectric layer 120 which are not covered by the patterned photoresist layer PR2. After the patterning process of the dielectric layer 120 is performed, a patterned dielectric layer 1202 including sensing wells 122 defined therein is formed on the sensing film 110. The first sensing portion 110a and the second sensing portion 110b may be accessibly revealed by the sensing wells 122 defined in the patterned dielectric layer 1202.

Referring to FIG. 11A, a cover 170 including fluid channels 172 may be disposed over the patterned dielectric layer 1202. A semiconductor structure 10A is then provided. For example, the semiconductor structure 10A includes a biosensor including the sensor S1, the patterned dielectric layer 1202 with the sensing wells 122, and the cover 170 disposed on the patterned dielectric layer 1202. The sensor S1 includes the bio-sensing device 150a and the voltage-reference device 150b. The bio-sensing device 150a includes the first FET 140a and the first sensing portion 110b of the sensing film 110 which is capacitively coupled to the first FET 140a, and the voltage-reference device 150b includes the second FET 140b and the second sensing portion 110b of the sensing film 110 which is capacitively coupled to the second FET 140b. The fluid channels 172 of the cover 170 may be distributed at the inner surface of the cover 170, and the fluid channels 172 of the cover 170 are in communication with the sensing wells 122 formed in the patterned dielectric layer 1202. The fluid channels 172 of the cover 170 may guide and filtrate the capture reagent applied to the biosensor.

Capture reagents are applied to the biosensor, the fluid channels 172 filtrate and guide the applied capture reagents to the sensor S1. The applied capture reagents immobilize the sensing regions (e.g., 110a and 110b) of the sensing film 110 such that sensing regions act as surface receptors to detect the presence of a target analyte of biological origin. During detecting the presence of a target analyte of biological origin, the gate electrode 134b1, S/D regions 138b1 and the second region 100R2 of the semiconductor substrate 100 are electrically connected to a reference voltage through the interconnect conductors (not individually shown) embedded in the interconnect structure 160. Take the detection data measured from the voltage-reference device 150b as a reference, the detection data measured from the bio-sensing device 150a may be more reliable. Accordingly, the sensor S1 may detect the presence of a target analyte of biological origin precisely.

Referring to FIG. 11B and with reference to FIG. 11A, it should be noted that the top view of FIG. 11B only shows the relative position of the bio-sensing device 150a, the voltage-reference device 150b, the isolation structure 102h, and the thermal management device 140h, and other features of the semiconductor structure 10A are omitted for clarity purposes. In addition, FIG. 11A shows the cross-sectional configuration of the bio-sensing device 150a, the voltage-reference device 150b, the isolation structure 102h, and the thermal management devices 140h taken along the dotted line A-A' of FIG. 11B.

As illustrated in FIGS. 11A-11B, the sensor S1 includes the bio-sensing device 150a and the voltage-reference device 150b disposed side by side. In some embodiments, in the top view, the bio-sensing device 150a is surrounded by the isolation structure 102h, and the isolation structure 102h separates the bio-sensing device 150a from the voltage-reference device 150b. The isolation structure 102h may have a substantially rectangular (or rounded rectangular) top-view shape; however, the isolation structure 102h may be arranged to form a ring, oval, square, polygon, or other shape around the bio-sensing device 150a from the top view. For example, in the top view, the boundary line of the bio-sensing device 150a is defined by the bottom surfaces 102hb (e.g., wider ends) of the isolation structures 102h, and the boundary line of the bio-sensing device 150a is spaced apart from the boundary line of the voltage-reference device 150b by the bottom surface 102hb of the isolation structure 102h having a lateral dimension D1, where the lateral dimension D1 is non-zero.

The thermal management devices 140h may be disposed on the bottom surface 102hb of the isolation structure 102h, and in the top view, the configuration of the thermal management devices 140h may follow the path of the isolation structure 102h to surround the bio-sensing device 150a. For example, at least four thermal management devices 140h surround the bio-sensing device 150a, such as the thermal management device 140h to the left, right, top and bottom of the bio-sensing device 150a. In the top view of FIG. 11B, the continuous ring surrounding the bio-sensing device 150a is defined by the isolation structure 102h, and the thermal management devices 140h may be disposed on any location of the path of the continuous ring, depending on process and product requirements. The location and the number of the thermal management devices 140h construe no limitation in the disclosure as long as the thermal management devices 140h are disposed on the path of the ring.

In some embodiments, the thermal management devices 140h may serve as heating source of resistors to alter a temperature of the first sensing portion 110a, such as to promote desired operation of the bio-sensing device 150a. The heat output of the thermal management devices 140h may depend on the applied power supply voltage. In some embodiments, the thermal management devices 140h are resistive elements coupled to a suitable current supply (not individually shown). The thermal management devices 140h may be supplied with current through the interconnect conductors (not individually shown) of the interconnect structure 160. For example, electric current may pass the thermal management devices 140h (e.g., resistors) to heat up the chemical fluid in the sensing well 122 and/or the fluid channels 172. The thermal management devices 140h are located between the interconnect conductors of the interconnect structure 160 and the fluid so that the heat does not need to warm and diffuse through the interconnect conductors to reach the fluid. The semiconductor structure 10A places the thermal management devices 140h in proximity to the bio-sensing device 150a enabling localized heating, precision heating, and multiplexed temperature control for multiplexed bio-sensing applications. It should be noted that the arrangement of the bio-sensing device 150a, the voltage-reference device 150b, the isolation structure 102h, and the thermal management device 140h is merely for illustration, other arrangements may be implemented.

Referring to FIG. 11C and with reference to FIGS. 11A-11B, the top view of FIG. 11C only shows the relative position of the bio-sensing device 150a, multiple voltage-reference devices 150b, the isolation structure 102h, and the thermal management device 140h, and other features of the semiconductor structure 10A are omitted for clarity purposes. In addition, FIG. 11A shows the cross-sectional configuration of the bio-sensing device 150a, one of the voltage-reference device 150b, the isolation structure 102h, and the thermal management devices 140h taken along the dotted line A-A' of FIG. 11C. The configuration of FIG. 11C is similar to the configuration of FIG. 11B, except that at least four voltage-reference devices 150b surround the bio-sensing device 150a. For example, in the top view, four voltage-reference devices 150b are respectively disposed on the left side, the right side, the top side, and the bottom side of the bio-sensing device 150a. In some embodiments, the centers of two of the voltage-reference devices 150b disposed on the left and right sides of the bio-sensing device 150a are substantially aligned with the center of the bio-sensing device 150a along the X-direction, from the top view. Similarly, the centers of two of the voltage-reference devices 150b disposed on the top and bottom sides of the bio-sensing device 150a may be substantially aligned with the center of the bio-sensing device 150a along the Y-direction, from the top view.

FIGS. 12A, 13A, 14A, 15A, 16A, and 17A are schematic cross-sectional views illustrating various semiconductor structures, and FIGS. 12B, 13B, 14B, 15B, 16B, and 17B-17C are schematic and simplified top views illustrating various configuration of the structures corresponding to FIGS. 12A, 13A, 14A, 15A, 16A, and 17A, respectively, in accordance with some embodiments. Unless specified otherwise, the materials and the formation methods of the components in these embodiments are essentially the same as the like components, which are denoted by like reference numerals in the embodiments.

Figure 12A:
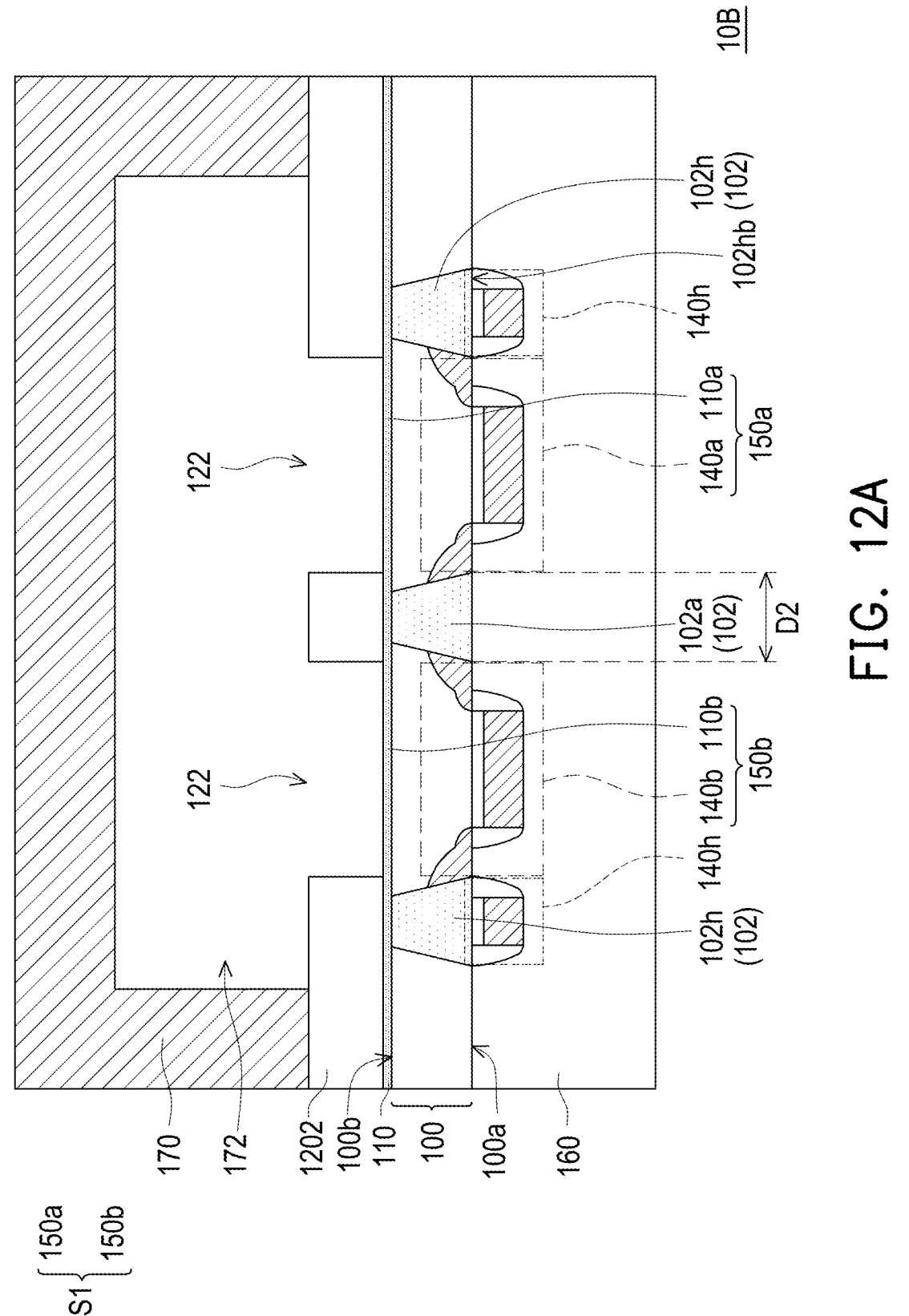
FIGS. 12A, 13A, 14A, 15A, 16A, and 17A are schematic cross-sectional views illustrating various semiconductor structures, in accordance with some embodiments.
Figure 12B:
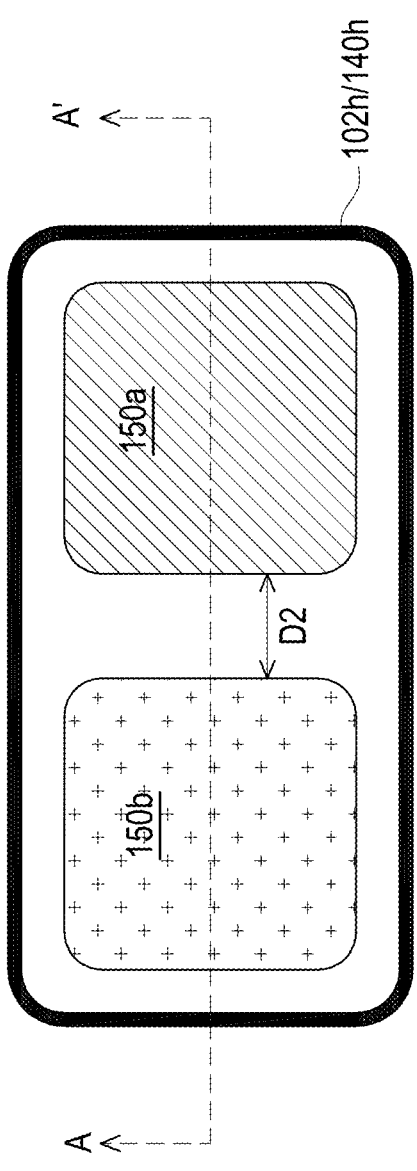
FIGS. 12B, 13B, 14B, 15B, 16B, and 17B-17D are schematic and simplified top views illustrating various configuration of the structures corresponding to FIGS. 12A, 13A, 14A, 15A, 16A, and 17A, respectively, in accordance with some embodiments.

Referring to FIGS. 12A-12B and with reference to FIGS. 11A-11B, the top view of FIG. 12B only shows the relative position of the bio-sensing device 150a, the voltage-reference device 150b, the isolation structure 102h, and the thermal management device 140h, and other features of the semiconductor structure 10B are omitted for clarity purposes. In addition, FIG. 12A shows the cross-sectional configuration of the bio-sensing device 150a, the voltage-reference device 150b, the isolation structure 102h, and the thermal management devices 140h taken along the dotted line A-A' of FIG. 12B. A semiconductor structure 10B of FIG. 12A and the top view of FIG. 12B are similar to the semiconductor structure 10A illustrated in FIG. 11A and the top view of FIG. 11B, respectively. The difference therebetween includes that the thermal management devices 140h of the semiconductor structure 10B landing on the isolation structures 102h may encircle both of the bio-sensing device 150a and the voltage-reference device 150b.

In some embodiments, the bio-sensing device 150a and the voltage-reference device 150b of the semiconductor structure 10B are separated from each other by a lateral dimension D2. The lateral dimension D2 may be substantially equal to the width of the bottom surface 102hb of the isolation structure 102a. In the top view of FIG. 12B, a continuous ring is defined by the isolation structure 102h, both of the bio-sensing device 150a and the voltage-reference device 150b are confined within a space defined by the continuous ring. The thermal management devices 140h may be disposed on the path of the continuous ring in the top view. The location and the number of the thermal management devices 140h disposed on the path of the ring construe no limitation in the disclosure.

Figure 13A:
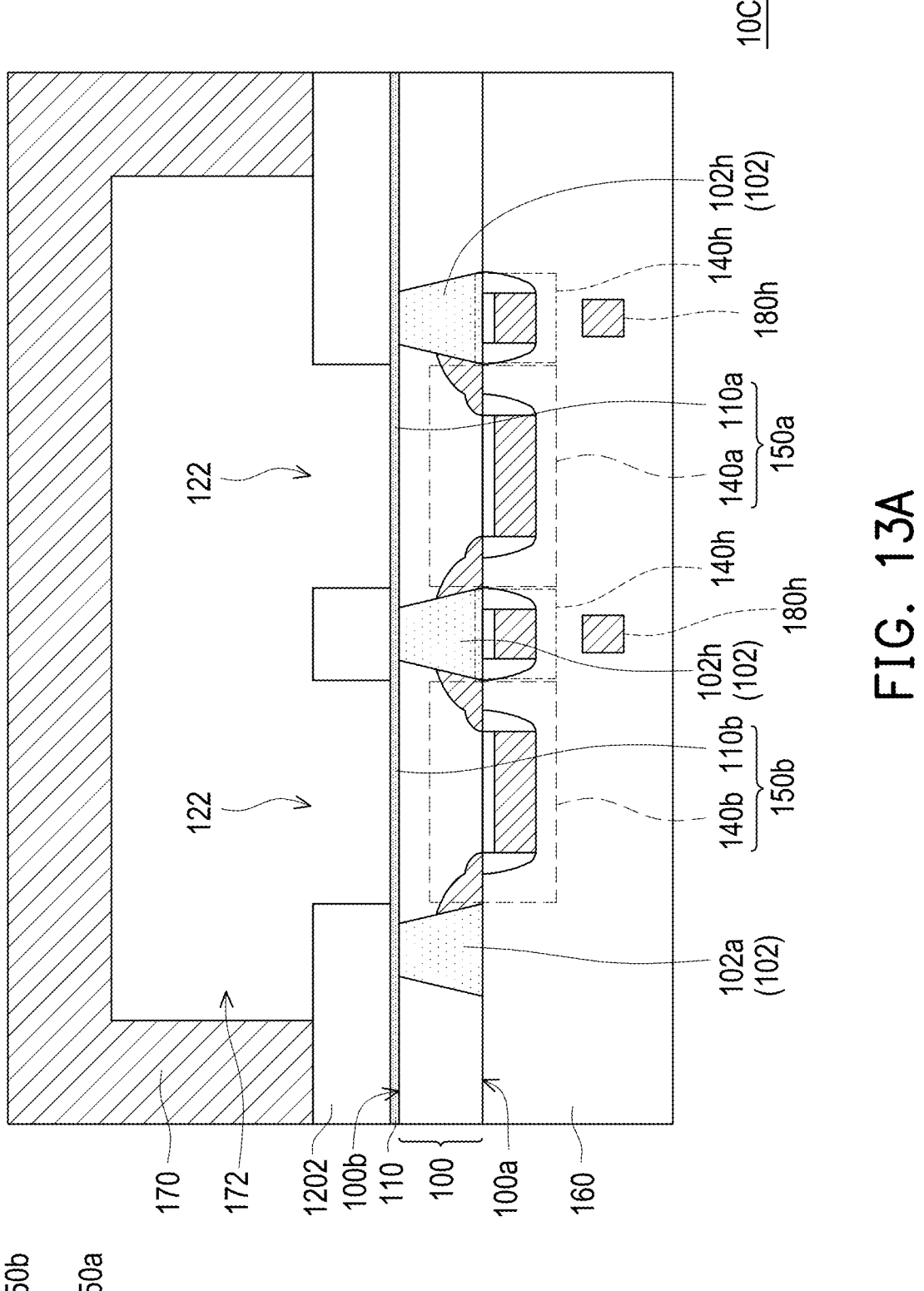
Figure 13B:
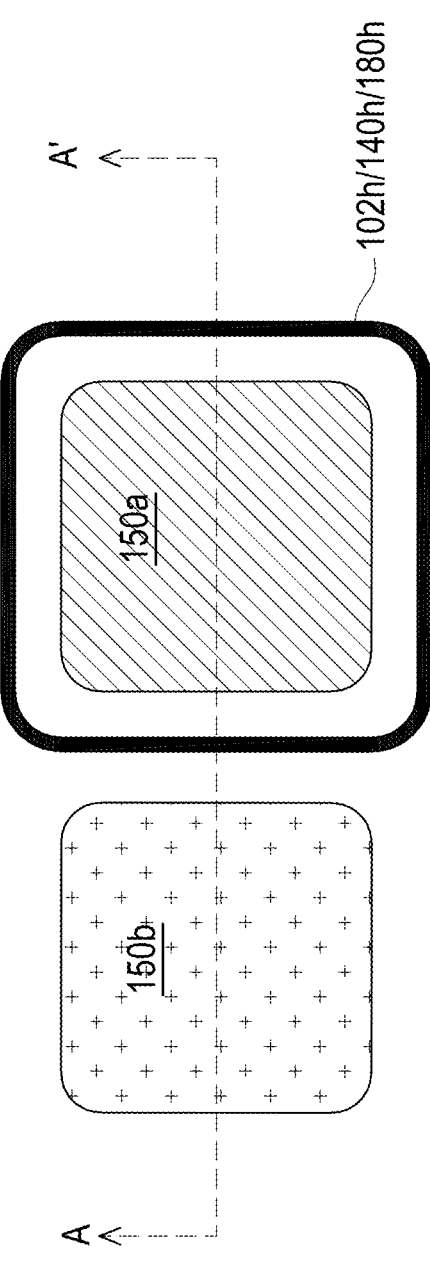

Referring to FIGS. 13A-13B and with reference to FIGS. 11A-11B, a semiconductor structure 10C of FIG. 13A and the top view of FIG. 13B are similar to the semiconductor structure 10A illustrated in FIG. 11A and the top view of FIG. 11B, respectively. Thus, the detailed descriptions are not repeated for the sake of brevity. The difference lies in that the semiconductor structure 10C of FIG. 13A further includes at least one additional thermal management device 180h embedded in the interconnect structure 160. The material of the additional thermal management devices 180h may include at least one of metal or polysilicon. In some embodiments, a power source (not individually shown) is connected to the interconnect structure 160 within which the thermal management devices 140h and 180h are included. In some embodiments, the additional thermal management devices 180h are metal patterns formed in the dielectric layers of the interconnect structure 160. The additional thermal management devices 180h may be formed at any level of the interconnect structure 160 which is not limited thereto. In some embodiments, the additional thermal management devices 180h are supplied with current through the interconnect conductors (not individually shown) of the interconnect structure 160. In some embodiments, a single power source is implemented, such as where the thermal management devices 140h and/or 180h are connected in series. In some embodiments, multiple power sources are implemented, where respective power supplies cause current to flow within some but fewer than all thermal management devices 140h and/or 180h.

In some embodiments, the additional thermal management devices 180h are disposed right below the thermal management devices 140h with a one-to-one correspondence. For example, in the top view of FIG. 13B, the continuous ring surrounding the bio-sensing device 150a is formed by the isolation structure 102h, the thermal management devices 140h may be disposed on any location of the path of the continuous ring, and the additional thermal management devices 180h are disposed on the locations where the thermal management devices 140h are disposed on. The location and the number of the thermal management devices 140h and 180h construe no limitation in the disclosure as long as the thermal management devices 140h are disposed on the path of the ring.

Figure 14A:
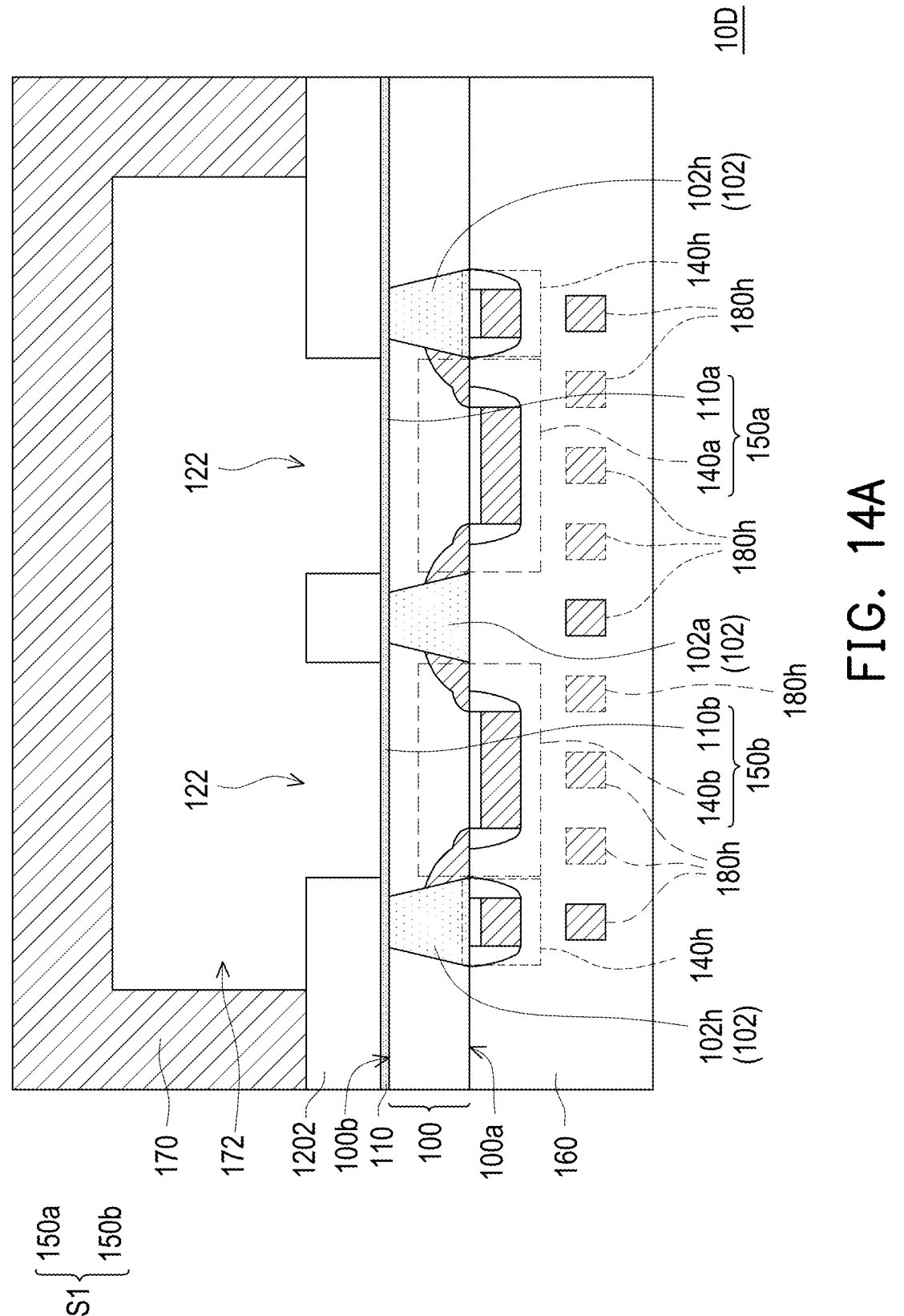
Figure 14B:
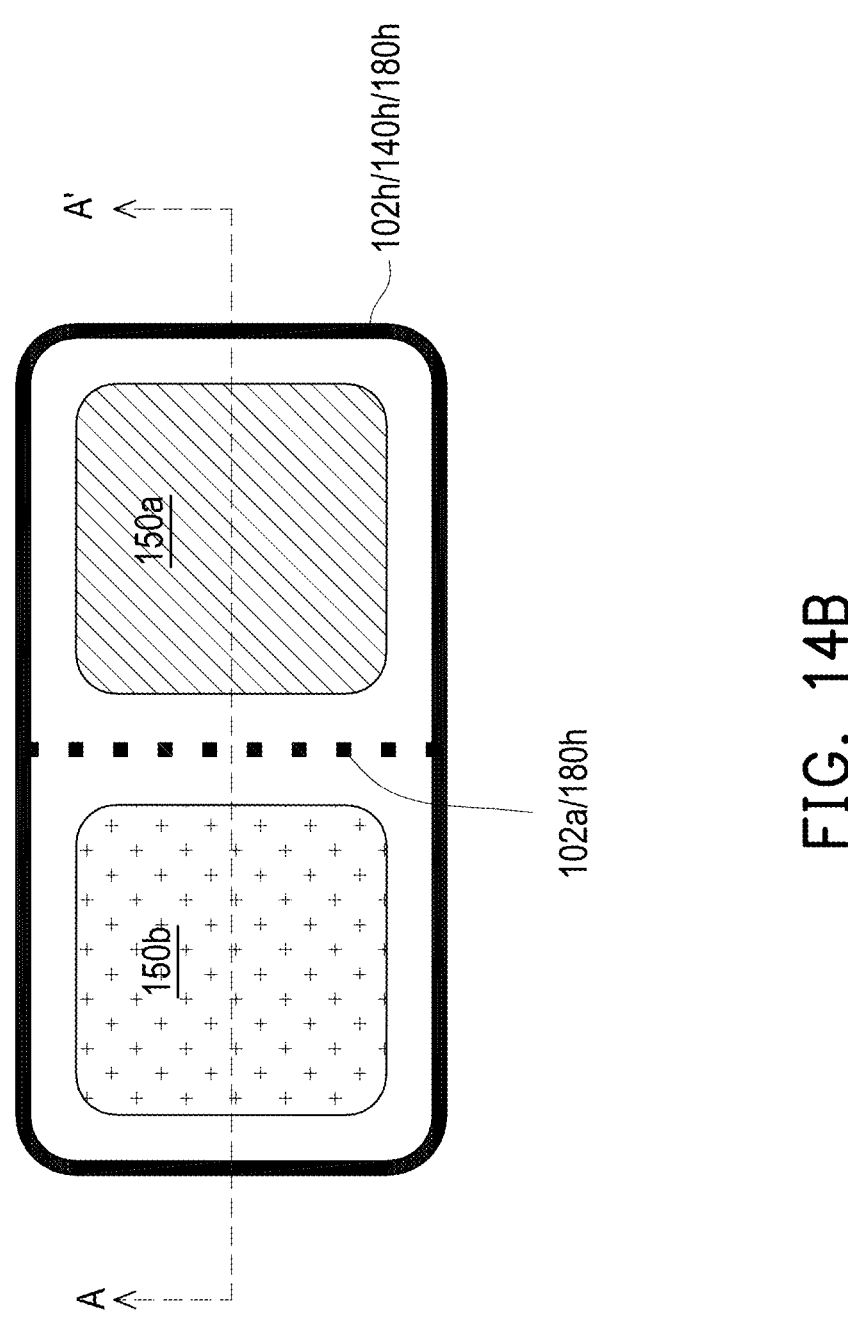

Referring to FIGS. 14A-14B and with reference to FIGS. 12A-12B and 13A-13B, a semiconductor structure 10D of FIG. 14A and the top view of FIG. 14B are similar to the semiconductor structure 10B illustrated in FIG. 12A and the top view of FIG. 12B, respectively. Thus, the detailed descriptions are not repeated for the sake of brevity. The difference lies in that the semiconductor structure 10D of FIG. 14A further includes the additional thermal management devices 180h disposed in the interconnect structure 160. The thermal management devices 180h of the semiconductor structure 10D may be similar to the thermal management devices 180h of the semiconductor structure 10C described in FIGS. 13A-13B, except that the thermal management devices 180h of the semiconductor structure 10D are not only disposed right below the thermal management devices 140h but also disposed right below the isolation structure 102a.

In some embodiments, the thermal management devices 180h disposed right below the thermal management devices 140h and the thermal management devices 180h disposed right below the isolation structure 102a are located at the same level in the interconnect structure 160. Alternatively, the thermal management devices 180h are disposed at different levels in the interconnect structure 160. In some embodiments, the thermal management devices 180h are disposed not only below the thermal management devices 140*h* and the isolation structure 102*a* but also below the first FET 140*a* and/or the second FET 140*b*. The thermal management devices 180*h* below the first FET 140*a* and/or the second FET 140*b* may be located at a same level as the thermal management devices 180*h* below the thermal management devices 140*h* and the isolation structure 102*a*, or may be located at different levels in the interconnect structure 160. The thermal management devices 180*h* below the first FET 140*a* and/or the second FET 140*b* illustrated in FIG. 14A are shown in dashed lines to indicate they may (or may not) exist.

In the top view, the thermal management devices 180*h* disposed right below the thermal management devices 140*h* may be located on the path of the continuous ring that encircles both of the bio-sensing device 150*a* and the voltage-reference device 150*b*, while the thermal management device 180*h* disposed right below the isolation structure 102*a* may be located between the bio-sensing device 150*a* and the voltage-reference device 150*b* from the top view. In the top view of FIG. 14B, the dashed line between the bio-sensing device 150*a* and the voltage-reference device 150*b* shows the path where the thermal management device 180*h* may be disposed on. It should be noted that the arrangement of the bio-sensing device 150*a*, the voltage-reference device 150*b*, the isolation structures 102*h* and 102*a*, and the thermal management devices 140*h* and 180*h* is merely for illustration, other arrangements may be implemented.

Figure 15A:
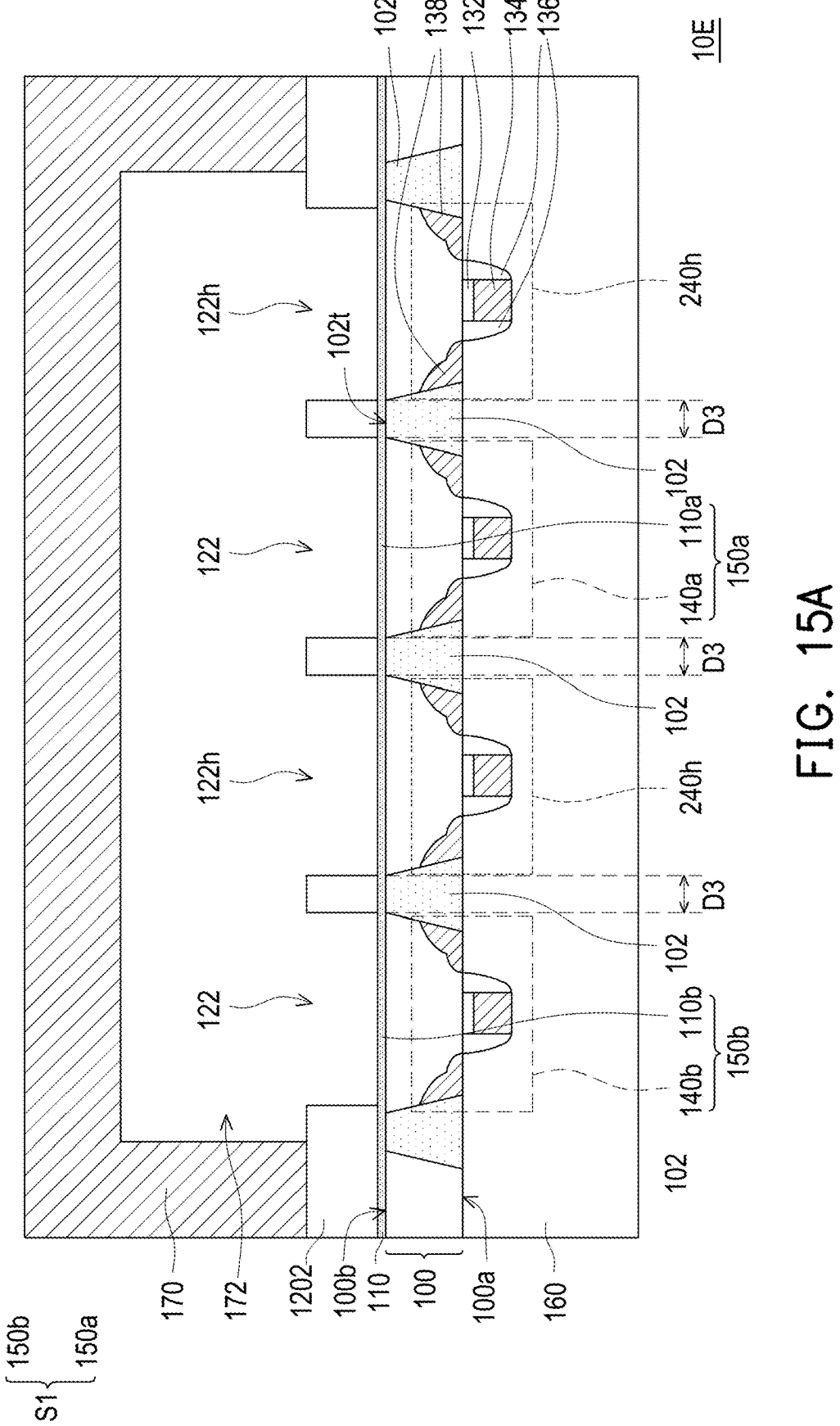
Figure 15B:
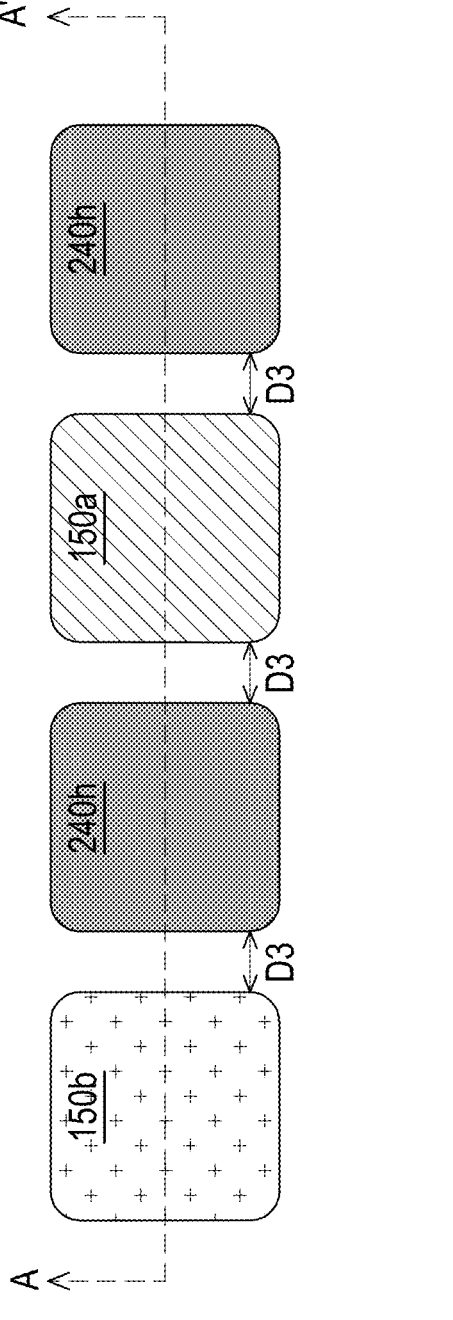

Referring to FIGS. 15A-15B, a semiconductor structure 10E includes the sensor S1 including the bio-sensing device 150*a* and the voltage-reference device 150*b*, the thermal management devices 240*h* disposed on opposing sides of the bio-sensing device 150*a*, the sensing wells 122 formed in the patterned dielectric layer 1202 and right above the bio-sensing device 150*a* and the voltage-reference device 150*b*, and the fluid channels 172 of the cover 170 configured to guide and filtrate the capture reagent applied to the biosensor. Each thermal management device 240*h* includes the gate electrode 134*h* and the S/D regions 138*h* which collectively configure as a FET. The thermal management devices 240*h* may be formed during the same steps of formation of the first and second FETs 140*a* and 140*b*, and the materials of the gate electrode 134*h* and the S/D regions 138*h* may be similar to the first (or the second) FET. The patterned dielectric layer 1202 may further include openings 122*h* located right above the thermal management devices 240*h*. The gate electrode 134*h* and the S/D regions 138*h* of the thermal management device 240*h* may be electrically coupled to the interconnect conductors (not individually shown) of the interconnect structure 160 in order to generate heat. For example, the thermal management devices 240*h* are operative to heat the fluids in the sensing wells 122 and/or the fluid channels 172.

In the top view of FIG. 15B, the bio-sensing device 150*a*, the voltage-reference device 150*b*, and the thermal management devices 240*h* are disposed side by side. For example, one of the thermal management devices 240*h* is disposed between the bio-sensing device 150*a* and the voltage-reference device 150*b*, and the thermal management devices 240*h* are disposed on the opposing sides of the bio-sensing device 150*a*. The bio-sensing device 150*a* and/or the voltage-reference device 150*b* may be separated from the thermal management devices 240*h* by a lateral dimension D3, where the lateral dimension D3 is non-zero. In some embodiments, the lateral dimension D3 is substantially equal to the width of the top surface 102*t* (e.g., narrower end) of the isolation structure 102. In some other embodiments, the additional thermal management devices 180*h* (as shown in FIGS. 13A and 14A) may be embedded in the interconnect structure 160, and may be disposed right below the thermal management devices 240*h* or below the isolation structures 102. It should be noted that the arrangement of the bio-sensing device 150*a*, the voltage-reference device 150*b*, and the thermal management devices 240*h* is merely for illustration, other arrangements may be implemented.

Figure 16A:
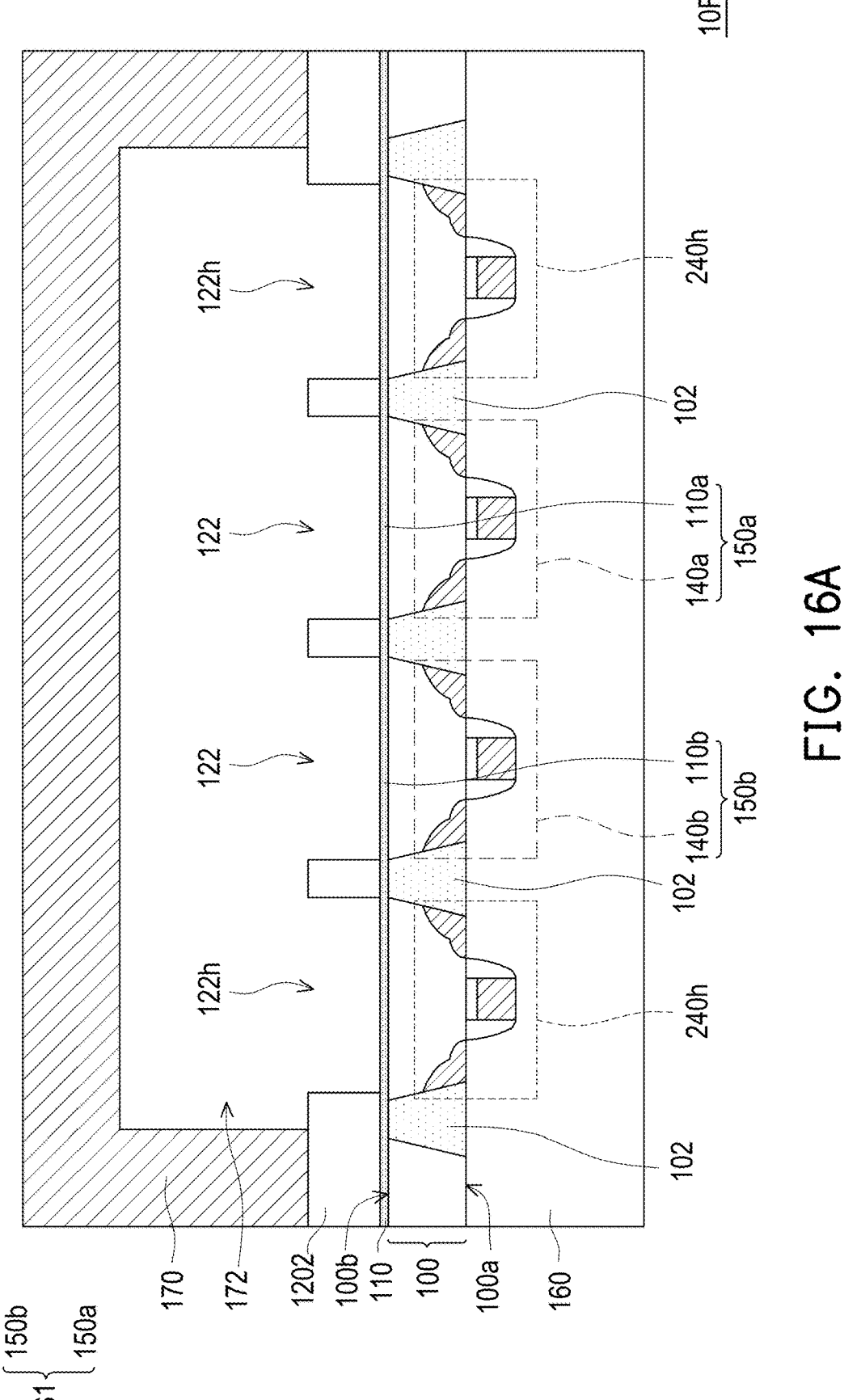
Figure 16B:
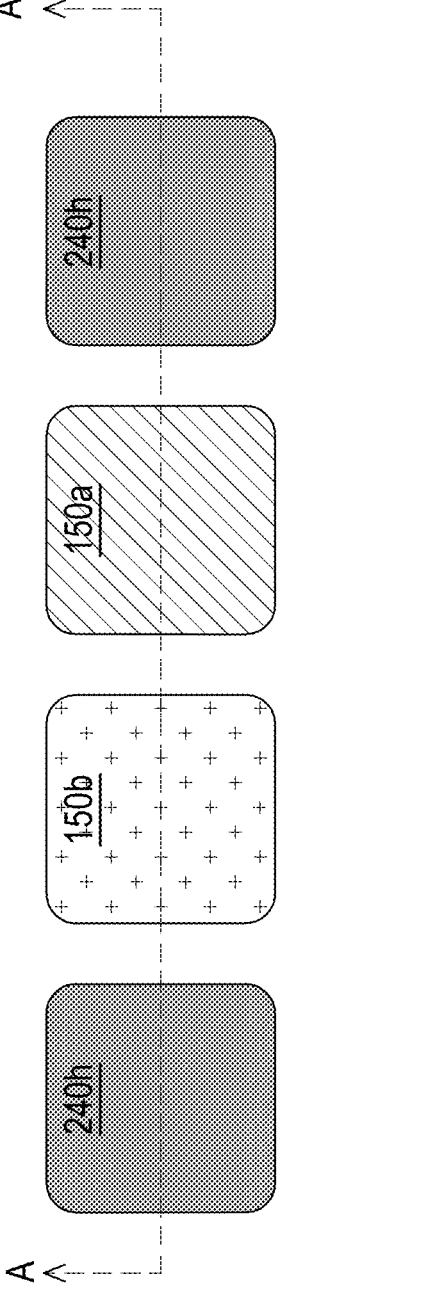

Referring to FIGS. 16A-16B and with reference to FIGS. 15A-15B, a semiconductor structure 10F of FIG. 16A and the top view of FIG. 16B are similar to the semiconductor structure 10E of FIG. 15A and the top view of the FIG. 15B, respectively. The difference therebetween lies in that the bio-sensing device 150*a* and the voltage-reference device 150*b* are located between the thermal management devices 240*h* which may be operational to heat fluids. For example, one of the thermal management devices 240*h* is disposed on the left side of the voltage-reference device 150*b*, while the other one of the thermal management devices 240*h* is disposed on the right side of the bio-sensing device 150*a*. Again, the arrangement of the bio-sensing device 150*a*, the voltage-reference device 150*b*, and the thermal management devices 240*h* is merely for illustration, other arrangements may be implemented.

Figure 17A:
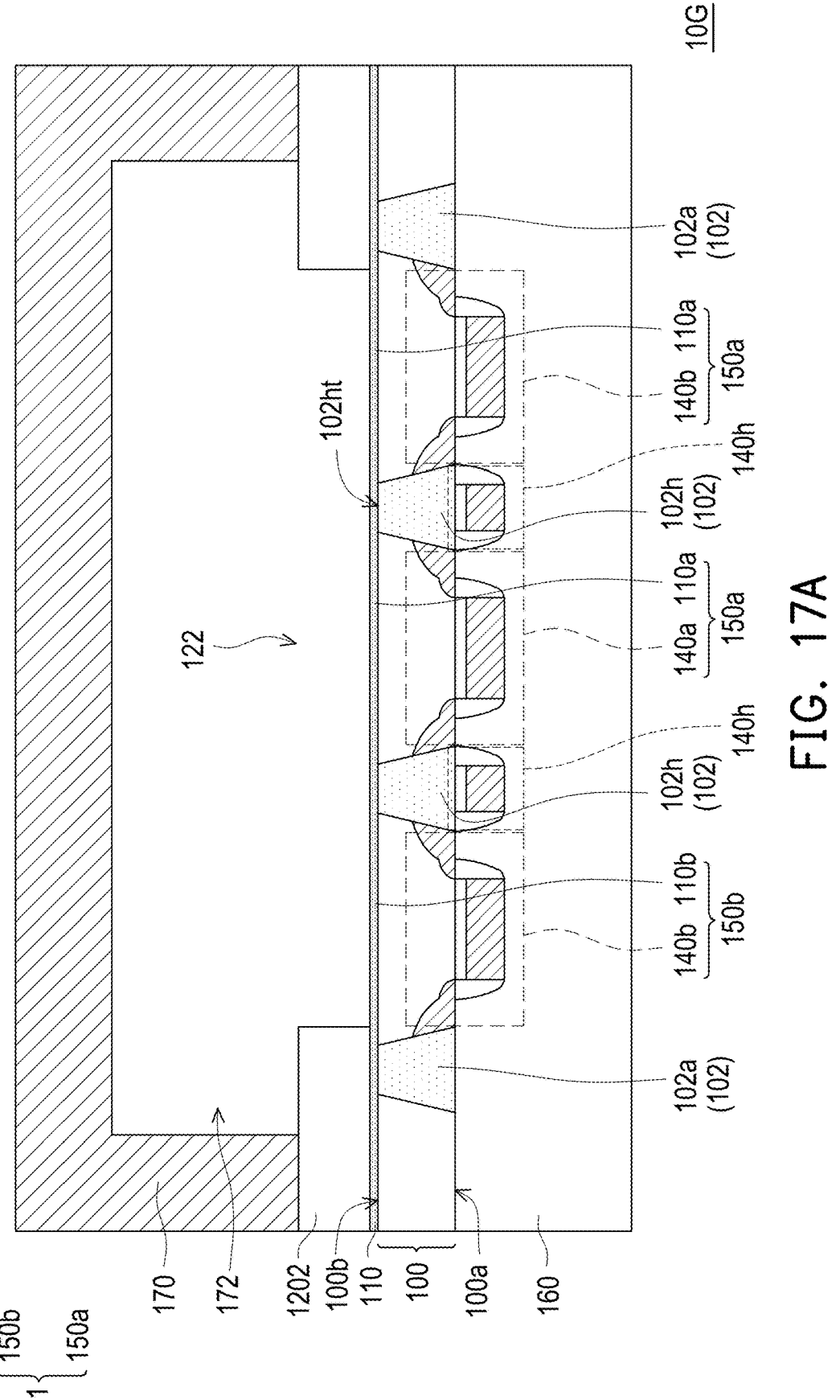
Figure 17B:
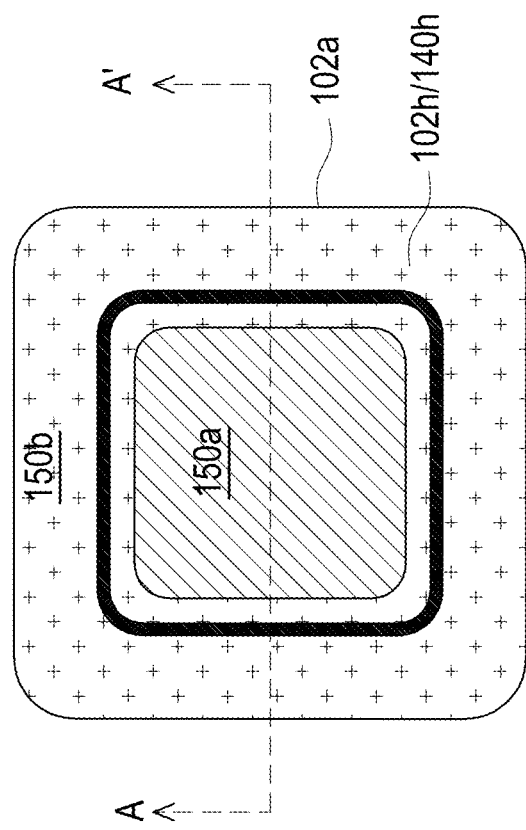

Referring to FIGS. 17A-17B, a semiconductor structure 10G includes the sensor S1 including the bio-sensing device 150*a* and the voltage-reference devices 150*b*, the thermal management devices 140*h* surrounding the bio-sensing device 150*a*, the sensing wells 122 formed in the patterned dielectric layer 1202 and disposed right above the bio-sensing device 150*a*, the voltage-reference devices 150*b*, and the thermal management devices 140*h*, and the fluid channels 172 of the cover 170 configured to guide and filtrate the capture reagent applied to the biosensor. In some embodiments, not only the bio-sensing device 150*a* and the voltage-reference devices 150*b*, but also the top surfaces 102*ht* (e.g., narrower ends) of the isolation structures 102*h* are right below the sensing wells 122. For example, no patterned dielectric layer 1202 is formed right above the top surfaces 102*ht* of the isolation structures 102*h*. In the top view, the continuous ring formed by the isolation structure 102*h* may encircles the bio-sensing device 150*a*, the thermal management devices 140*h* may be disposed on the path of the continuous ring, and the boundary line of the voltage-reference devices 150*b* may be defined by the isolation structure 102*a* which may encircle the continuous ring. As illustrated in the cross-sectional view of FIG. 17A, two thermal management devices 140*h* are disposed on the left and right sides of the bio-sensing device 150*a*, one of the voltage-reference devices 150*b* is disposed on the left side of the left one of the thermal management devices 140*h*, and the other one of the voltage-reference devices 150*b* is disposed on the right side of the right one of the thermal management devices 140*h*.

Figure 17D:
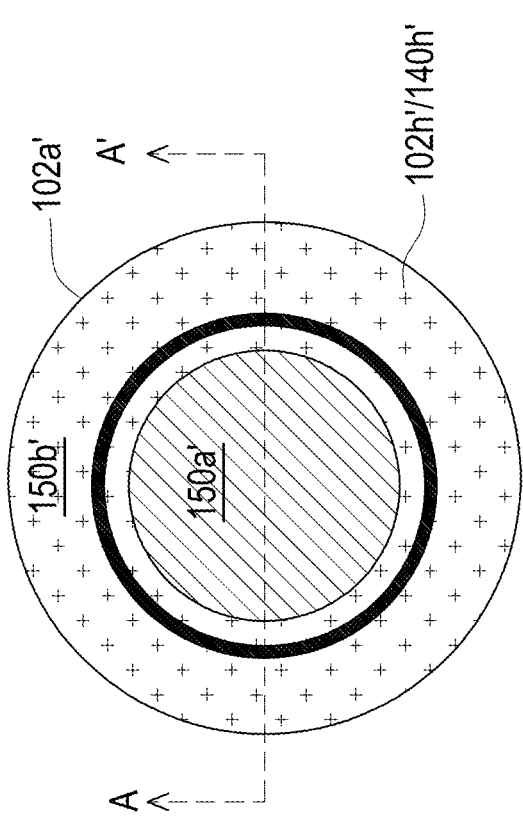
Figure 17C:
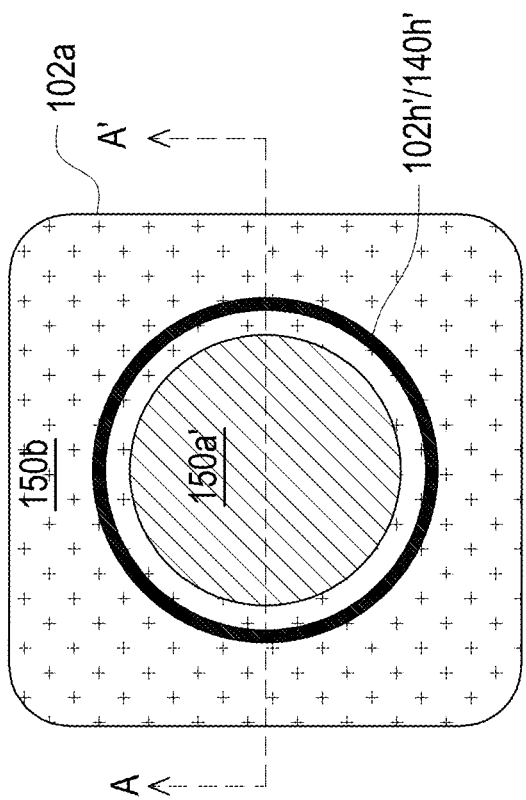

Referring to FIGS. 17C-17D and with reference to FIG. 17B, the top views of FIGS. 17C-17D are similar to the top view of FIG. 17B. The difference between the top views of FIGS. 17C and 17B includes that the boundary line of the bio-sensing device 150*a*' may have a substantially circular top-view shape. In some embodiments, a configuration of thermal management devices 140*h*', such as a circular arrangement, is formed around the bio-sensing device 150*a*'. For example, the path of continuous ring formed by the isolation structures 102*h*' may have a substantially circular ring shape corresponding to the boundary line of the bio-sensing device 150*a*'. The thermal management devices 140*h*' may be disposed on the circular ring formed by the isolation structures 102h'. The boundary line of the voltage-reference devices 150b defined by the isolation structure 102a may be of a rectangular-like shape from the top view. The circular configuration may prevent bubbles from accumulating in corners.

In some embodiments, a configuration of the voltage-reference devices 150b', such as circular arrangement, is formed around the thermal management devices 140h' and the bio-sensing device 150a'. For example, the boundary line of the voltage-reference devices 150b' defined by the isolation structure 102a' may have a substantially circular top-view shape, as illustrated in FIG. 17D. The boundary line of the voltage-reference devices 150b', the ring defined by the isolation structure 102h, and the boundary line of the bio-sensing device 150a' may be concentric. Again, the arrangements of the bio-sensing device, the voltage-reference devices, and the thermal management devices provided herein are merely for illustration, other arrangements may be implemented.

According to some embodiments, a semiconductor structure includes a first isolation structure penetrating through a semiconductor substrate, a biosensor coupled to the semiconductor substrate, and a cover. The biosensor includes a bio-sensing device, at least one voltage-reference device spaced apart from the bio-sensing device, first thermal management devices disposed in proximity to the bio-sensing device, and a patterned dielectric layer. The bio-sensing device includes a first gate structure disposed on a bottom surface of the semiconductor substrate, first S/D regions disposed in the semiconductor substrate, and a first portion of a sensing film disposed on a top surface of the semiconductor substrate and capacitively coupled to the first gate structure and the first S/D regions. The voltage-reference device includes a second gate structure disposed on the bottom surface of the semiconductor substrate, second S/D regions disposed in the semiconductor substrate, and a second portion of the sensing film disposed on the top surface of the semiconductor substrate and capacitively coupled to the second gate structure and the second S/D regions. Each of the first thermal management devices includes a third gate structure disposed on a bottom surface of the first isolation structure or on the bottom surface of the semiconductor substrate. The patterned dielectric layer is disposed over the top surface of the semiconductor substrate and includes sensing wells located above the voltage-reference device and the bio-sensing device. The cover is disposed over the patterned dielectric layer and includes fluid channels communicating with the sensing wells.

According to some alternative embodiments, a semiconductor structure includes an isolation structure penetrating through a semiconductor substrate, a biosensor coupled to the semiconductor substrate, and a cover. The biosensor includes a bio-sensing device, a voltage-reference device spaced apart from the bio-sensing device, first thermal management devices disposed in proximity to the bio-sensing device, and a patterned dielectric layer disposed over the semiconductor substrate. The bio-sensing device includes a first FET and a first portion of a sensing film capacitively coupled to the first FET, the voltage-reference device includes a second FET and a second portion of the sensing film capacitively coupled to the second FET, and the first thermal management devices includes a gate dielectric layer underlying the isolation structure, a gate electrode underlying the gate dielectric layer, and gate spacers extending along sidewalls of the gate dielectric layer and gate electrode to land on the isolation structure. The patterned dielectric layer includes sensing wells located above the voltage-reference device and the bio-sensing device, and the cover is disposed over the patterned dielectric layer and includes fluid channels communicating with the sensing wells.

According to some alternative embodiments, a semiconductor structure includes an isolation structure penetrating through a semiconductor substrate, a biosensor coupled to the semiconductor substrate, a cover, and an interconnect structure underlying the semiconductor substrate. The biosensor includes a bio-sensing device, a voltage-reference device spaced apart from the bio-sensing device, thermal management devices disposed in proximity to the bio-sensing device, and a patterned dielectric layer disposed over the semiconductor substrate. The bio-sensing device includes a first FET and a first portion of a sensing film capacitively coupled to the first FET, the voltage-reference device includes a second FET and a second portion of the sensing film capacitively coupled to the second FET, and each of the thermal management devices includes a third FET. The patterned dielectric layer includes sensing wells located above the voltage-reference device and the bio-sensing device and openings located above the thermal management devices. The cover is disposed over the patterned dielectric layer and includes fluid channels communicating with the sensing wells. The interconnect structure is electrically coupled to the first FET, the second FET, and the third FET.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor structure, comprising:
a first isolation structure penetrating through a semiconductor substrate;
a biosensor coupled to the semiconductor substrate and comprising:
a bio-sensing device comprising a first gate structure disposed on a bottom surface of the semiconductor substrate, first source/drain (S/D) regions disposed in the semiconductor substrate, and a first portion of a sensing film disposed on a top surface of the semiconductor substrate and capacitively coupled to the first gate structure and the first S/D regions;
at least one voltage-reference device spaced apart from the bio-sensing device, the at least one voltage-reference device comprising a second gate structure disposed on the bottom surface of the semiconductor substrate, second S/D regions disposed in the semiconductor substrate, and a second portion of the sensing film disposed on the top surface of the semiconductor substrate and capacitively coupled to the second gate structure and the second S/D regions;
first thermal management devices disposed in proximity to the bio-sensing device, each of the first thermal management devices comprising a third gate structure disposed on a bottom surface of the first isolation structure or on the bottom surface of the semiconductor substrate, a first gate spacer disposed on a first sidewall of the third gate structure, and a second gate spacer disposed on a second sidewall of the third gate structure opposite to the first sidewall, wherein the first gate spacer and the second gate spacer are interfaced with the first isolation structure; and a patterned dielectric layer disposed over the top surface of the semiconductor substrate, and the patterned dielectric layer comprising sensing wells located above the at least one voltage-reference device and the bio-sensing device; and a cover comprising a first portion overlapping the semiconductor substrate, a second portion connecting the first portion to the patterned dielectric layer, and fluid channels disposed within the first portion and the second portion and communicating with the sensing wells.

2. The semiconductor structure of claim 1, wherein:

the third gate structure of each of the first thermal management device is disposed on the bottom surface of the first isolation structure, and the first isolation structure encircles the bio-sensing device in a top view.

3. The semiconductor structure of claim 2, wherein:

both of the at least one voltage-reference device and the bio-sensing device are included in a boundary of the first isolation structure in the top view.

4. The semiconductor structure of claim 2, further comprising:

an interconnect structure underlying the bottom surface of the semiconductor substrate and covering the first, second, and third gate structures, and second thermal management devices embedded in the interconnect structure and disposed below the third gate structures of the first thermal management devices.

5. The semiconductor structure of claim 1, wherein:

the first S/D regions of the bio-sensing device are coupled to a portion of inner sidewalls of the first isolation structure, and the second S/D regions of the at least one voltage-reference device are coupled to another portion of the inner sidewalls of the first isolation structure.

6. The semiconductor structure of claim 1, further comprising:

a second isolation structure penetrating through the semiconductor substrate, wherein in a top view, the at least one voltage-reference device and the bio-sensing device are disposed at two opposing sides of the second isolation structure.

7. The semiconductor structure of claim 6, further comprising:

a second thermal management device disposed right below the second isolation structure.

8. The semiconductor structure of claim 1, further comprising:

second thermal management devices disposed right below the first and second gate structures.

9. The semiconductor structure of claim 1, wherein:

the first isolation structure is tapered from the respective third gate structure toward the sensing film.

10. The semiconductor structure of claim 1, wherein the first isolation structure is laterally and vertically offset from the second portion of the cover.

11. The semiconductor structure of claim 1, wherein:

the at least one voltage-reference device and the bio-sensing device are arranged along a first direction, and the semiconductor structure further comprises second thermal management devices disposed between the at least one voltage-reference device and the bio-sensing device and arranged along a second direction different from the first direction.

12. The semiconductor structure of claim 1, wherein a gate dielectric layer of the third gate structure of the respective first thermal management device is in contact with the bottom surface of the first isolation structure.

13. The semiconductor structure of claim 1, wherein the first gate spacer and the second gate spacer of the respective first thermal management device are located within a span of the first isolation structure.

14. A semiconductor structure, comprising:

an isolation structure penetrating through a semiconductor substrate;

a biosensor coupled to the semiconductor substrate and comprising:

a bio-sensing device comprising a first field effect transistor (FET) and a first portion of a sensing film capacitively coupled to the first FET;

a voltage-reference device spaced apart from the bio-sensing device, the voltage-reference device comprising a second FET and a second portion of the sensing film capacitively coupled to the second FET;

first thermal management devices disposed in proximity to the bio-sensing device, each of the first thermal management devices comprising a gate dielectric layer underlying the isolation structure, a gate electrode underlying the gate dielectric layer, a first gate spacer extending along first sidewalls of the gate dielectric layer and the gate electrode, and a second gate spacer extending along second sidewalls of the gate dielectric layer and the gate electrode opposite to the first sidewalls, wherein the first gate spacer and the second gate spacer are interfaced with the isolation structure; and a patterned dielectric layer disposed over the semiconductor substrate, and the patterned dielectric layer comprising sensing wells located above the voltage-reference device and the bio-sensing device; and a cover disposed over the patterned dielectric layer and comprising fluid channels communicating with the sensing wells.

15. The semiconductor structure of claim 14, further comprising:

an interconnect structure underlying the semiconductor substrate and electrically coupled to the bio-sensing device, the voltage-reference device, and the first thermal management devices.

16. The semiconductor structure of claim 14, further comprising:

second thermal management devices embedded in the interconnect structure and below the first thermal management devices.

17. The semiconductor structure of claim 14, wherein the isolation structure at least encircles the bio-sensing device in a top view.

18. A semiconductor structure, comprising:

an isolation structure penetrating through a semiconductor substrate;

a biosensor coupled to the semiconductor substrate and comprising:

a bio-sensing device comprising a first field effect transistor (FET) and a first portion of a sensing film capacitively coupled to the first FET;

a voltage-reference device spaced apart from the bio-sensing device, the voltage-reference device comprising a second FET and a second portion of the sensing film capacitively coupled to the second FET;

thermal management devices disposed in proximity to the bio-sensing device, and the thermal management devices comprising a gate stack, a pair of gate spacers covering opposing sidewalls of the gate stack, wherein bottom surfaces of the pair of gate spacers are in contact with the isolation structure; and a patterned dielectric layer disposed over the semiconductor substrate, and the patterned dielectric layer comprising located above the voltage-reference device and the bio-sensing device;

a cover disposed over the patterned dielectric layer and comprising fluid channels communicating with the sensing wells, and an interconnect structure underlying the semiconductor substrate and electrically coupled to the first FET, the second FET, and the gate stack of the thermal management devices.

19. The semiconductor structure of claim 18, wherein each of the first FET and the second FET comprises:

a gate structure underlying the semiconductor substrate; and source/drain (S/D) regions disposed in the semiconductor substrate and corresponding to the gate structure.

20. The semiconductor structure of claim 18, wherein:

the bio-sensing device, the voltage-reference device, and the thermal management devices are disposed side by side in a row from a top view, and one of the thermal management devices is disposed at the end of the row, and another one of the thermal management devices is disposed between the bio-sensing device and the voltage-reference device or disposed at the front of the row.

* * * * *